US009900076B2

(12) United States Patent
Liu et al.

(10) Patent No.: US 9,900,076 B2
(45) Date of Patent: Feb. 20, 2018

(54) METHOD FOR ACQUIRING CHANNEL INFORMATION, APPARATUS, AND SYSTEM

(71) Applicant: Huawei Technologies Co., Ltd., Shenzhen (CN)

(72) Inventors: Kunpeng Liu, Beijing (CN); Jianghua Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/198,939

(22) Filed: Jun. 30, 2016

(65) Prior Publication Data

US 2016/0315683 A1    Oct. 27, 2016

Related U.S. Application Data

(63) Continuation of application No. PCT/CN2013/091224, filed on Dec. 31, 2013.

(51) Int. Cl.
*H04L 7/00*       (2006.01)
*H04L 27/06*      (2006.01)
(Continued)

(52) U.S. Cl.
CPC ........... *H04B 7/0632* (2013.01); *H01Q 9/285* (2013.01); *H04B 7/0456* (2013.01);
(Continued)

(58) Field of Classification Search
USPC ...... 375/211, 219, 222, 240, 240.26–240.27, 375/256, 285, 284, 295, 316, 340, 246,
(Continued)

(56) References Cited

U.S. PATENT DOCUMENTS

RE45,299 E * 12/2014 Papasakellariou ... H04B 7/0452
                                                   370/208
8,964,523 B2 *  2/2015 Zhu ......................... H04B 7/04
                                                   370/208
(Continued)

FOREIGN PATENT DOCUMENTS

CN         101170336 A      4/2008
CN         101931443 A     12/2010
(Continued)

OTHER PUBLICATIONS

Foreign Communication From a Counterpart Application, European Application No. 13900672.0, Extended European Search Report dated Dec. 5, 2016, 8 pages.
(Continued)

*Primary Examiner* — Linda Wong
(74) *Attorney, Agent, or Firm* — Conley Rose, P.C.

(57) ABSTRACT

Embodiments of the present disclosure provide a method for acquiring channel information, an apparatus, and a system, relate to the communications field, and can reduce overhead of pilot signals in a process of acquiring channel state information. In various embodiments, a base station selects first preset antennas from an antenna array, maps the first preset antennas to pilot signals, and sends the pilot signals and antenna configuration information to a terminal, and the terminal obtains channel state information of second preset antennas by means of calculation according to the pilot signals and the antenna configuration information. The present disclosure can be applied for acquiring channel state information.

18 Claims, 13 Drawing Sheets

(51) Int. Cl.
*H04B 7/06* (2006.01)
*H01Q 9/28* (2006.01)
*H04B 7/0456* (2017.01)
*H04B 7/04* (2017.01)
*H04L 5/00* (2006.01)
*H04W 72/04* (2009.01)
*H01Q 1/24* (2006.01)
*H01Q 21/26* (2006.01)

(52) U.S. Cl.
CPC ......... *H04B 7/0469* (2013.01); *H04B 7/0602* (2013.01); *H04B 7/0617* (2013.01); *H04B 7/0626* (2013.01); *H04B 7/0691* (2013.01); *H04L 5/0023* (2013.01); *H04L 5/0048* (2013.01); *H04L 5/0094* (2013.01); *H01Q 1/246* (2013.01); *H01Q 21/26* (2013.01); *H04W 72/046* (2013.01)

(58) Field of Classification Search
USPC ......................................... 375/347, 348, 358
See application file for complete search history.

(56) References Cited

U.S. PATENT DOCUMENTS

| | | | | |
|---|---|---|---|---|
| 2008/0260052 A1* | 10/2008 | Hayashi | ................... | H04L 1/20 375/260 |
| 2011/0075743 A1* | 3/2011 | Koike | ................ | H04L 25/0204 375/259 |
| 2011/0176622 A1* | 7/2011 | Higashinaka | ........ | H04J 11/0033 375/259 |
| 2011/0205930 A1* | 8/2011 | Rahman | ............... | H04B 7/0417 370/252 |
| 2012/0082190 A1* | 4/2012 | Zhu | ........................ | H04B 7/063 375/219 |
| 2012/0134440 A1* | 5/2012 | Yun | ...................... | H04L 5/0048 375/295 |
| 2012/0195397 A1* | 8/2012 | Sayana | ................. | H04L 25/022 375/340 |
| 2012/0224662 A1* | 9/2012 | Wakizaka | ........... | H04L 25/0204 375/346 |
| 2012/0263245 A1* | 10/2012 | Carbonelli | .......... | H04L 25/0232 375/260 |
| 2012/0263254 A1* | 10/2012 | Wang | .................... | H04L 5/0048 375/295 |
| 2012/0288022 A1* | 11/2012 | Guey | ................... | H04B 7/0691 375/267 |
| 2013/0010880 A1 | 1/2013 | Koivisto et al. | | |
| 2013/0114656 A1 | 5/2013 | Sayana et al. | | |
| 2013/0343499 A1* | 12/2013 | Ren | ..................... | H04L 5/1469 375/349 |
| 2014/0098689 A1* | 4/2014 | Lee | ..................... | H04B 7/0469 370/252 |
| 2014/0192762 A1 | 7/2014 | Li et al. | | |
| 2014/0226612 A1* | 8/2014 | Kim | ...................... | H04B 7/024 370/329 |
| 2014/0307816 A1* | 10/2014 | Alex | .................... | H04B 7/0413 375/267 |
| 2015/0063287 A1 | 3/2015 | Mazzarese et al. | | |
| 2015/0139151 A1 | 5/2015 | Seo et al. | | |
| 2015/0288497 A1* | 10/2015 | Li | ......................... | H04B 7/0413 370/329 |
| 2015/0334726 A1 | 11/2015 | Gao et al. | | |

FOREIGN PATENT DOCUMENTS

| | | |
|---|---|---|
| CN | 102273091 A | 12/2011 |
| CN | 102916735 A | 2/2013 |
| CN | 102938688 A | 2/2013 |
| CN | 103209012 A | 7/2013 |
| CN | 103314544 A | 9/2013 |
| CN | 103391576 A | 11/2013 |
| EP | 2665211 A2 | 11/2013 |
| EP | 2849481 A1 | 3/2015 |
| WO | 2011153286 A1 | 12/2011 |
| WO | 2013068135 A1 | 5/2013 |
| WO | 2013147565 A2 | 10/2013 |
| WO | 2013166932 A1 | 11/2013 |

OTHER PUBLICATIONS

Foreign Communication From a Counterpart Application, PCT Application No. PCT/CN2013/091224, English Translation of International Search Report dated Sep. 3, 2014, 2 pages.
Foreign Communication From a Counterpart Application, PCT Application No. PCT/CN2013/091224, English Translation of Written Opinion dated Sep. 3, 2014, 8 pages.
Alcatel-Lucent, et al., "Considerations on CSI feedback enhancements for high-priority antenna configurations," 3GPP TSG-RAN WG1 #66, R1-112420, Aug. 22-26, 2011, 8 pages.
Foreign Communication From a Counterpart Application, Japanese Application No. 2016-543583, Japanese Notice of Reasons for Rejection dated Aug. 22, 2017, 2 pages.
Foreign Communication From a Counterpart Application, Japanese Application No. 2016-543583, English Translation of Japanese Notice of Reasons for Rejection dated Aug. 29, 2017, 4 pages.
Machine Translation and Abstract of Chinese Publication No. CN101170336, Apr. 30, 2008, 9 pages.
Foreign Communication From a Counterpart Application, Chinese Application No. 201380033133.2, Chinese Office Action dated Jun. 27, 2017, 19 pages.

* cited by examiner

P3-1　　　　　　　　P3-2

P3-3　　　　　　　　P3-4

P3-5   P3-6

P3-7   P3-8   P3-9

P3-10   P3-11   P3-12

P3-13

P3-14       P3-15       P3-16

P3-17

P3-18   P3-19

P3-20   P3-21

P3-26

P3-27

METHOD FOR ACQUIRING CHANNEL INFORMATION, APPARATUS, AND SYSTEM

CROSS-REFERENCE TO RELATED APPLICATION

This application is a continuation of International Application No. PCT/CN2013/091224, filed on Dec. 31, 2013, which is incorporated herein by reference in its entirety.

TECHNICAL FIELD

The present disclosure relates to the communications field, and in particular, to a method for acquiring channel information, an apparatus, and a system.

BACKGROUND

It was proposed at the 34$^{th}$ Conference of the Long Term Evolution (LTE) Advanced Standardization Subgroup that, to further improve a total throughput rate and an average throughput rate that are of cell users, there is a need to specially conduct research on advanced radio interface technologies for 4$^{th}$ Generation (4G) systems (Advanced Radio Interface TechnologIes for 4G SysTems, (ARTIST4G)). A dynamic three-dimensional (3D) beamforming technology and a 3D multi-antenna technology are key technologies for improving a throughput rate of cell-edge users and a total throughput rate and an average throughput rate that are of cell users, and attract great attention from the industry.

In an existing active antenna system, 3D beamforming may be performed. Refer to FIG. 1 (crosswise arranged antennas are dual-polarized antennas (there are two polarization directions at positive 45 degrees and at negative 45 degrees), and antennas arranged in parallel are co-polarized antennas (there is only one polarization direction)). One form in the active antenna system is a two-dimensional (2D) planar antenna array, and the antenna array have both a horizontal dimension and a vertical dimension. By sending pilot signals, a base station obtains channel state information of the 2D antenna array that is fed back by a terminal, so that a beam aims at a target user in 3D space, signal receive power is further increased, a signal to interference plus noise ratio is increased, and a throughput of the entire system is further improved.

In a process of implementing the foregoing 3D beamforming technology, the inventor finds that in the prior art, a relatively large quantity of antennas provided in an antenna array causes an increase in pilot signal overheads.

SUMMARY

Embodiments of the present disclosure provide a method for acquiring channel information, an apparatus, and a system, which can reduce overhead of pilot signals.

To achieve the foregoing objective, the following technical solutions are adopted in the embodiments of the present disclosure.

According to a first aspect, a method for acquiring channel information is provided, including mapping, by a base station, first preset antennas in an antenna array to pilot signals; sending the pilot signals and the antenna configuration information to a terminal, where the antenna configuration information includes pattern information of the first preset antennas and pattern information of second preset antennas; and receiving channel state information of the second preset antennas that is fed back by the terminal; where the first preset antennas and the second preset antennas are in the same antenna array, and the first preset antennas are different from the second preset antennas.

With reference to the first aspect, in a first possible implementation manner, when the antenna array is a dual-polarized antenna array, the first preset antennas include at least two antennas are not in a same row, at least two antennas are not in a same column, and at least two antennas are in different polarization directions.

With reference to the first possible implementation manner of the first aspect, in a second possible implementation manner, the first preset antennas further include the antennas are in pairs, antennas in each pair are in a same row and a same column, and all the antenna pairs are in different rows and different columns.

With reference to the first possible implementation manner of the first aspect, in a third possible implementation manner, the first preset antennas further include there is an antenna in only one polarization direction in a same row and a same column, a difference between quantities of antennas in two polarization directions cannot exceed 1, and all the antennas are in different rows and different columns.

With reference to the first possible implementation manner of the first aspect, in a fourth possible implementation manner, the first preset antennas further include the antennas are in pairs, antennas in each pair are in a same row and a same column, there is an interval of a same quantity of rows between antenna pairs in a same column, there is an interval of a same quantity of columns between every two adjacent columns that include antennas, and antenna pairs in every two adjacent columns that include antennas are not in a same row; or the antennas are in pairs, antennas in each pair are in a same row and a same column, there is an interval of a same quantity of columns between antenna pairs in a same row, there is an interval of a same quantity of rows between every two adjacent rows that include antennas, and antenna pairs in every two adjacent rows that include antennas are not in a same column.

With reference to the first possible implementation manner of the first aspect, in a fifth possible implementation manner, the first preset antennas further include there is an antenna in only one polarization direction in a same row and a same column, there is an interval of a same quantity of rows between antennas in a same column, the antennas in the same column are sequentially in alternate polarization directions or are in a same polarization direction, there is an interval of a same quantity of columns between every two adjacent columns that include antennas, and antennas in every two adjacent columns that include the antennas are not in a same row; or there is an antenna in only one polarization direction in a same row and a same column, there is an interval of a same quantity of columns between antennas in a same row, the antennas in the same row are sequentially in alternate polarization directions or are in a same polarization direction, there is an interval of a same quantity of rows between every two adjacent rows that include antennas, and antennas in every two adjacent rows that include the antennas are not in a same column.

With reference to the first possible implementation manner of the first aspect, in a sixth possible implementation manner, the first preset antennas further include embodiments where antennas at each of four corners of the antenna array that includes the first preset antennas are in pairs.

With reference to the first possible implementation manner of the first aspect, in a seventh possible implementation manner, the first preset antennas further include embodiments where there is one antenna at each of four corners of the antenna array that includes the first preset antennas, and quantities of antennas in two polarization directions are the same.

With reference to the first possible implementation manner of the first aspect, in an eighth possible implementation manner, the first preset antennas further include embodiments where only one pair of antennas exists, antennas in the pair are in a same row and a same column, there is an interval of a same quantity of columns between antennas in one polarization direction in the row, and there is an interval of a same quantity of rows between antennas in the other polarization direction in the column.

With reference to the first possible implementation manner of the first aspect, in a ninth possible implementation manner, the first preset antennas further include embodiments where only one pair of antennas exists, antennas in the pair are in a same row and a same column, there is an interval of a same quantity of columns between antennas in one polarization direction in the row, and a column in which any one of the antennas in the polarization direction is located includes antennas in the other polarization direction at an equal interval of a same quantity of rows; or only one pair of antennas exists, antennas in the pair are in a same row and a same column, there is an interval of a same quantity of rows between antennas in one polarization direction in the column, and a row in which any one of the antennas in the polarization direction is located includes antennas in the other polarization direction at an equal interval of a same quantity of columns.

With reference to the first possible implementation manner of the first aspect, in a tenth possible implementation manner, the first preset antennas further include embodiments where there is an interval of a same quantity of columns between antennas in one polarization direction in a same row, and a column in which any one of the antennas in the polarization direction is located includes antennas in the other polarization direction at an equal interval of a same quantity of rows; or there is an interval of a same quantity of rows between antennas in one polarization direction in a same column, and a row in which any one of the antennas in the polarization direction is located includes antennas in the other polarization direction at an equal interval of a same quantity of columns.

With reference to the first aspect, in an eleventh possible implementation manner, when the antenna array is a dual-polarized antenna array, the first preset antennas include embodiments where at least two antennas are not in a same row, and at least two antennas are not in a same column.

With reference to the eleventh possible implementation manner of the first aspect, in a twelfth possible implementation manner, the first preset antennas further include embodiments where all the antennas are in different rows and different columns.

With reference to the eleventh possible implementation manner of the first aspect, in a thirteenth possible implementation manner, the first preset antennas further include embodiments where there is an interval of a same quantity of rows between antennas in a same column, there is an interval of a same quantity of columns between every two adjacent columns that include antennas, and antennas in every two adjacent columns that include the antennas are not in a same row; or there is an interval of a same quantity of columns between antennas in a same row, there is an interval of a same quantity of rows between every two adjacent rows that include antennas, and antennas in every two adjacent rows that include the antennas are not in a same column.

With reference to the eleventh possible implementation manner of the first aspect, in a fourteenth possible implementation manner, the first preset antennas further include embodiments where there is one antenna at each of four corners of the antenna array that includes the first preset antennas.

With reference to the eleventh possible implementation manner of the first aspect, in a fifteenth possible implementation manner, the first preset antennas further include embodiments where there is an interval of a same quantity of columns between antennas in one row, and a column in which any one of the antennas in the row is located includes antennas at an equal row interval.

With reference to the first aspect and the first to the fifteenth possible implementation manners of the first aspect, in a sixteenth possible implementation manner, when the second preset antennas include the first preset antennas, the antenna configuration information includes pattern information of the first preset antennas in the second preset antennas.

With reference to the first aspect and the first to the fifteenth possible implementation manners of the first aspect, in a seventeenth possible implementation manner, when the second preset antennas do not include the first preset antennas, the antenna configuration information includes pattern information of the first preset antennas in the antenna array; and pattern information of the second preset antennas in the antenna array.

With reference to the first aspect or any one of possible implementation manners of the first aspect, in an eighteenth possible implementation manner, the antenna configuration information includes at least one of an interval between antennas and correlation coefficients between the antennas.

According to a second aspect, an acquisition method for acquiring channel information is provided, including acquiring, by a terminal, pilot signals and the antenna configuration information that are sent by a base station, where the pilot signals are pilot signals to which first preset antennas in an antenna array are mapped, and the antenna configuration information includes pattern information of the first preset antennas and pattern information of second preset antennas; obtaining, by the terminal, channel state information of the second preset antennas by means of calculation according to the pilot signals and the antenna configuration information; and sending, by the terminal, the channel state information of the second preset antennas to the base station; where the first preset antennas and the second preset antennas are in the same antenna array, and the first preset antennas are different from the second preset antennas.

With reference to the second aspect, in a first possible implementation manner, when the antenna array is a dual-polarized antenna array, the first preset antennas include embodiments where at least two antennas are not in a same row, at least two antennas are not in a same column, and at least two antennas are in different polarization directions.

With reference to the first possible implementation manner of the second aspect, in a second possible implementation manner, the first preset antennas further include embodiments where the antennas are in pairs, antennas in each pair are in a same row and a same column, and all the antenna pairs are in different rows and different columns.

With reference to the first possible implementation manner of the second aspect, in a third possible implementation manner, the first preset antennas further include embodiments where there is an antenna in only one polarization direction in a same row and a same column, a difference between quantities of antennas in two polarization directions cannot exceed 1, and all the antennas are in different rows and different columns.

With reference to the first possible implementation manner of the second aspect, in a fourth possible implementation manner, the first preset antennas further include embodiments where the antennas are in pairs, antennas in each pair are in a same row and a same column, there is an interval of a same quantity of rows between antenna pairs in a same column, there is an interval of a same quantity of columns between every two adjacent columns that include antennas, and antenna pairs in every two adjacent columns that include antennas are not in a same row; or the antennas are in pairs, antennas in each pair are in a same row and a same column, there is an interval of a same quantity of columns between antenna pairs in a same row, there is an interval of a same quantity of rows between every two adjacent rows that include antennas, and antenna pairs in every two adjacent rows that include antennas are not in a same column.

With reference to the first possible implementation manner of the second aspect, in a fifth possible implementation manner, the first preset antennas further include embodiments where there is an antenna in only one polarization direction in a same row and a same column, there is an interval of a same quantity of rows between antennas in a same column, the antennas in the same column are sequentially in alternate polarization directions or are in a same polarization direction, there is an interval of a same quantity of columns between every two adjacent columns that include antennas, and antennas in every two adjacent columns that include the antennas are not in a same row; or there is an antenna in only one polarization direction in a same row and a same column, there is an interval of a same quantity of columns between antennas in a same row, the antennas in the same row are sequentially in alternate polarization directions or are in a same polarization direction, there is an interval of a same quantity of rows between every two adjacent rows that include antennas, and antennas in every two adjacent rows that include the antennas are not in a same column.

With reference to the first possible implementation manner of the second aspect, in a sixth possible implementation manner, the first preset antennas further include embodiments where antennas at each of four corners of the antenna array that includes the first preset antennas are in pairs.

With reference to the first possible implementation manner of the second aspect, in a seventh possible implementation manner, the first preset antennas further include embodiments where there is one antenna at each of four corners of the antenna array that includes the first preset antennas, and quantities of antennas in two polarization directions are the same.

With reference to the first possible implementation manner of the second aspect, in an eighth possible implementation manner, the first preset antennas further include embodiments where only one pair of antennas exists, antennas in the pair are in a same row and a same column, there is an interval of a same quantity of columns between antennas in one polarization direction in the row, and there is an interval of a same quantity of rows between antennas in the other polarization direction in the column.

With reference to the first possible implementation manner of the second aspect, in a ninth possible implementation manner, the first preset antennas further include embodiments where only one pair of antennas exists, antennas in the pair are in a same row and a same column, there is an interval of a same quantity of columns between antennas in one polarization direction in the row, and a column in which any one of the antennas in the polarization direction is located includes antennas in the other polarization direction at an equal interval of a same quantity of rows; or only one pair of antennas exists, antennas in the pair are in a same row and a same column, there is an interval of a same quantity of rows between antennas in one polarization direction in the column, and a row in which any one of the antennas in the polarization direction is located includes antennas in the other polarization direction at an equal interval of a same quantity of columns.

With reference to the first possible implementation manner of the second aspect, in a tenth possible implementation manner, the first preset antennas further include embodiments where there is an interval of a same quantity of columns between antennas in one polarization direction in a same row, and a column in which any one of the antennas in the polarization direction is located includes antennas in the other polarization direction at an equal interval of a same quantity of rows; or there is an interval of a same quantity of rows between antennas in one polarization direction in a same column, and a row in which any one of the antennas in the polarization direction is located includes antennas in the other polarization direction at an equal interval of a same quantity of columns.

With reference to the second aspect, in an eleventh possible implementation manner, when the first antenna array is a co-polarized antenna array, the preset quantity of antennas include embodiments where at least two antennas are not in a same row, and at least two antennas are not in a same column.

With reference to the eleventh possible implementation manner of the second aspect, in a twelfth possible implementation manner, the first preset antennas further include embodiments where all the antennas are in different rows and different columns.

With reference to the eleventh possible implementation manner of the second aspect, in a thirteenth possible implementation manner, the first preset antennas further include embodiments where there is an interval of a same quantity of rows between antennas in a same column, there is an interval of a same quantity of columns between every two adjacent columns that include antennas, and antennas in every two adjacent columns that include the antennas are not in a same row; or there is an interval of a same quantity of columns between antennas in a same row, there is an interval of a same quantity of rows between every two adjacent rows that include antennas, and antennas in every two adjacent rows that include the antennas are not in a same column.

With reference to the eleventh possible implementation manner of the second aspect, in a fourteenth possible implementation manner, the first preset antennas further include embodiments where there is one antenna at each of four corners of the antenna array that includes the first preset antennas.

With reference to the eleventh possible implementation manner of the second aspect, in a sixteenth possible implementation manner, the first preset antennas further include embodiments where there is an interval of a same quantity of columns between antennas in one row, and a column in which any one of the antennas in the row is located includes antennas at an equal row interval.

With reference to the second aspect or any one of the first to the sixteenth possible implementation manners of the second aspect, in a seventeenth possible implementation manner, when the second preset antennas include the first preset antennas, the antenna configuration information includes pattern information of the first preset antennas in the second preset antennas.

With reference to the second aspect or any one of the first to the sixteenth possible implementation manners of the second aspect, in an eighteenth possible implementation manner, when the second preset antennas do not include the first preset antennas, the antenna configuration information includes pattern information of the first preset antennas in the antenna array; and pattern information of the second preset antennas in the antenna array.

With reference to the second aspect or any one of the first to the eighteenth possible implementation manners of the second aspect, in a nineteenth possible implementation manner, the antenna configuration information further includes at least one of an interval between antennas and correlation coefficients between the antennas.

With reference to the second aspect or any one of the first to the nineteenth possible implementation manners of the second aspect, in a twentieth possible implementation manner, the calculating, by the terminal, channel state information of the antenna array according to the pilot signals and the antenna configuration information includes acquiring a channel matrix corresponding to the first preset antennas from the pilot signals; acquiring a position relationship between the first preset antennas and the second preset antennas from the antenna configuration information; and performing an interpolation operation according to the channel matrix corresponding to the first preset antennas and the position relationship between the first preset antennas and the second preset antennas, to obtain the channel state information of the second preset antennas.

With reference to the second aspect or any one of the first to the twentieth possible implementation manners of the second aspect, in a twenty-first possible implementation manner, the sending the channel state information of the second preset antennas to the base station includes sending, to the base station, rank information, a precoding matrix indicator, and a channel quality indicator that are of the second preset antennas.

With reference to the second aspect or any one of the first to the twentieth possible implementation manners of the second aspect, in a twenty-second possible implementation manner, the sending the channel state information of the second preset antennas to the base station includes sending, to the base station, rank information, a precoding matrix indicator, and a channel quality indicator that are of the second preset antennas, and sending, to the base station, rank information, a precoding matrix indicator, and a channel quality indicator that are of the first preset antennas.

With reference to the second aspect or any one of the first to the twentieth possible implementation manners of the second aspect, in a twenty-third possible implementation manner, the sending the channel state information of the second preset antennas to the base station includes sending, to the base station, rank information of the second preset antennas, a structure of a differential codebook of precoding matrix indicators of the first preset antennas and the second preset antennas, and a channel quality indicator of the second preset antennas, and sending, to the base station, rank information, the precoding matrix indicator, and a channel quality indicator that are of the first preset antennas; or sending, to the base station, rank information of the second preset antennas, a precoding matrix indicator of the second preset antennas, and a differential channel quality indicator of the first preset antennas and the second preset antennas, and sending, to the base station, rank information, a precoding matrix indicator, and a channel quality indicator that are of the first preset antennas; or sending, to the base station, rank information of the second preset antennas, a structure of a differential codebook of precoding matrix indicators of the first preset antennas and the second preset antennas, and a differential channel quality indicator of the first preset antennas and the second preset antennas, and sending, to the base station, rank information, the precoding matrix indicator, and a channel quality indicator that are of the first preset antennas.

According to a third aspect, a base station is provided, including a mapping unit configured to map first preset antennas in an antenna array to pilot signals; a sending unit configured to send, to a terminal, the pilot signals mapped by the mapping unit and the antenna configuration information, where the antenna configuration information includes pattern information of the first preset antennas and pattern information of second preset antennas; and a receiving unit configured to receive channel state information of the second preset antennas that is fed back by the terminal; where the first preset antennas and the second preset antennas are in the same antenna array, and the first preset antennas are different from the second preset antennas.

With reference to the third aspect, in a first possible implementation manner, when the antenna array is a dual-polarized antenna array, the first preset antennas of the mapping unit include embodiments where at least two antennas are not in a same row, at least two antennas are not in a same column, and at least two antennas are in different polarization directions.

With reference to the first possible implementation manner of the third aspect, in a second possible implementation manner, the first preset antennas further include embodiments where the antennas are in pairs, antennas in each pair are in a same row and a same column, and all the antenna pairs are in different rows and different columns.

With reference to the first possible implementation manner of the third aspect, in a third possible implementation manner, the first preset antennas further include embodiments where there is an antenna in only one polarization direction in a same row and a same column, a difference between quantities of antennas in two polarization directions cannot exceed 1, and all the antennas are in different rows and different columns.

With reference to the first possible implementation manner of the third aspect, in a fourth possible implementation manner, the first preset antennas further include embodiments where the antennas are in pairs, antennas in each pair are in a same row and a same column, there is an interval of a same quantity of rows between antenna pairs in a same column, there is an interval of a same quantity of columns between every two adjacent columns that include antennas, and antenna pairs in every two adjacent columns that include antennas are not in a same row; or the antennas are in pairs, antennas in each pair are in a same row and a same column, there is an interval of a same quantity of columns between antenna pairs in a same row, there is an interval of a same quantity of rows between every two adjacent rows that include antennas, and antenna pairs in every two adjacent rows that include antennas are not in a same column.

With reference to the first possible implementation manner of the third aspect, in a fifth possible implementation manner, the first preset antennas further include embodiments where there is an antenna in only one polarization direction in a same row and a same column, there is an interval of a same quantity of rows between antennas in a same column, the antennas in the same column are sequentially in alternate polarization directions or are in a same polarization direction, there is an interval of a same quantity of columns between every two adjacent columns that include antennas, and antennas in every two adjacent columns that include the antennas are not in a same row; or there is an antenna in only one polarization direction in a same row and a same column, there is an interval of a same quantity of columns between antennas in a same row, the antennas in the same row are sequentially in alternate polarization directions or are in a same polarization direction, there is an interval of a same quantity of rows between every two adjacent rows that include antennas, and antennas in every two adjacent rows that include the antennas are not in a same column.

With reference to the first possible implementation manner of the third aspect, in a sixth possible implementation manner, the first preset antennas further include embodiments where antennas at each of four corners of the antenna array that includes the first preset antennas are in pairs.

With reference to the first possible implementation manner of the third aspect, in a seventh possible implementation manner, the first preset antennas further include embodiments where include embodiments where there is one antenna at each of four corners of the antenna array that includes the first preset antennas, and quantities of antennas in two polarization directions are the same.

With reference to the first possible implementation manner of the third aspect, in an eighth possible implementation manner, the first preset antennas further include embodiments where only one pair of antennas exists, antennas in the pair are in a same row and a same column, there is an interval of a same quantity of columns between antennas in one polarization direction in the row, and there is an interval of a same quantity of rows between antennas in the other polarization direction in the column.

With reference to the first possible implementation manner of the third aspect, in a ninth possible implementation manner, the first preset antennas further include embodiments where only one pair of antennas exists, antennas in the pair are in a same row and a same column, there is an interval of a same quantity of columns between antennas in one polarization direction in the row, and a column in which any one of the antennas in the polarization direction is located includes antennas in the other polarization direction at an equal interval of a same quantity of rows; or only one pair of antennas exists, antennas in the pair are in a same row and a same column, there is an interval of a same quantity of rows between antennas in one polarization direction in the column, and a row in which any one of the antennas in the polarization direction is located includes antennas in the other polarization direction at an equal interval of a same quantity of columns.

With reference to the first possible implementation manner of the third aspect, in a tenth possible implementation manner, the first preset antennas further include embodiments where there is an interval of a same quantity of columns between antennas in one polarization direction in a same row, and a column in which any one of the antennas in the polarization direction is located includes antennas in the other polarization direction at an equal interval of a same quantity of rows; or there is an interval of a same quantity of rows between antennas in one polarization direction in a same column, and a row in which any one of the antennas in the polarization direction is located includes antennas in the other polarization direction at an equal interval of a same quantity of columns.

With reference to the third aspect, in an eleventh possible implementation manner, when the antenna array is a co-polarized antenna array, when the first antenna array is a co-polarized antenna array, the preset quantity of antennas include embodiments where at least two antennas are not in a same row, and at least two antennas are not in a same column.

With reference to the eleventh possible implementation manner of the third aspect, in a twelfth possible implementation manner, the first preset antennas further include embodiments where all the antennas are in different rows and different columns.

With reference to the eleventh possible implementation manner of the third aspect, in a thirteenth possible implementation manner, the first preset antennas further include embodiments where there is an interval of a same quantity of rows between antennas in a same column, there is an interval of a same quantity of columns between every two adjacent columns that include antennas, and antennas in every two adjacent columns that include the antennas are not in a same row; or there is an interval of a same quantity of columns between antennas in a same row, there is an interval of a same quantity of rows between every two adjacent rows that include antennas, and antennas in every two adjacent rows that include the antennas are not in a same column.

With reference to the eleventh possible implementation manner of the third aspect, in a fourteenth possible implementation manner, the first preset antennas further include embodiments where there is one antenna at each of four corners of the antenna array that includes the first preset antennas.

With reference to the eleventh possible implementation manner of the third aspect, in a fifteenth possible implementation manner, the first preset antennas further include embodiments where there is an interval of a same quantity of columns between antennas in one row, and a column in which any one of the antennas in the row is located includes antennas at an equal row interval.

With reference to the third aspect and the first to the fifteenth possible implementation manners of the third aspect, in a sixteenth possible implementation manner, when the second preset antennas include the first preset antennas, the antenna configuration information sent by the sending unit includes pattern information of the first preset antennas in the second preset antennas.

With reference to the third aspect and the first to the fifteenth possible implementation manners of the third aspect, in a seventeenth possible implementation manner, when the second preset antennas do not include the first preset antennas, the antenna configuration information sent by the sending unit includes pattern information of the first preset antennas in the antenna array; and pattern information of the second preset antennas in the antenna array.

With reference to the third aspect or any one of possible implementation manners of the third aspect, in an eighteenth possible implementation manner, the antenna configuration information sent by the sending unit further includes at least one of an interval between antennas and correlation coefficients between the antennas.

According to a fourth aspect, a terminal is provided, including a receiving unit configured to receive pilot signals and the antenna configuration information that are sent by a base station, where the pilot signals are pilot signals to which first preset antennas in an antenna array are mapped, and the antenna configuration information includes pattern information of the first preset antennas and pattern information of second preset antennas; an acquiring unit configured to obtain channel state information of the second preset antennas by means of calculation according to the pilot signals and the antenna configuration information that are received by the receiving unit; and a sending unit configured to send, to the base station, the channel state information of the second preset antennas that is acquired by the acquiring unit; where the first preset antennas and the second preset antennas are in the same antenna array, and the first preset antennas are different from the second preset antennas.

With reference to the fourth aspect, in a first possible implementation manner, when the antenna array is a dual-polarized antenna array, the first preset antennas include embodiments where at least two antennas are not in a same row, at least two antennas are not in a same column, and at least two antennas are in different polarization directions.

With reference to the first possible implementation manner of the fourth aspect, in a second possible implementation manner, the first preset antennas further include embodiments where the antennas are in pairs, antennas in each pair are in a same row and a same column, and all the antenna pairs are in different rows and different columns.

With reference to the first possible implementation manner of the fourth aspect, in a third possible implementation manner, the first preset antennas further include embodiments where there is an antenna in only one polarization direction in a same row and a same column, a difference between quantities of antennas in two polarization directions cannot exceed 1, and all the antennas are in different rows and different columns.

With reference to the first possible implementation manner of the fourth aspect, in a fourth possible implementation manner, the first preset antennas further include embodiments where the antennas are in pairs, antennas in each pair are in a same row and a same column, there is an interval of a same quantity of rows between antenna pairs in a same column, there is an interval of a same quantity of columns between every two adjacent columns that include antennas, and antenna pairs in every two adjacent columns that include antennas are not in a same row; or the antennas are in pairs, antennas in each pair are in a same row and a same column, there is an interval of a same quantity of columns between antenna pairs in a same row, there is an interval of a same quantity of rows between every two adjacent rows that include antennas, and antenna pairs in every two adjacent rows that include antennas are not in a same column.

With reference to the first possible implementation manner of the fourth aspect, in a fifth possible implementation manner, the first preset antennas further include embodiments where there is an antenna in only one polarization direction in a same row and a same column, there is an interval of a same quantity of rows between antennas in a same column, the antennas in the same column are sequentially in alternate polarization directions or are in a same polarization direction, there is an interval of a same quantity of columns between every two adjacent columns that include antennas, and antennas in every two adjacent columns that include the antennas are not in a same row; or there is an antenna in only one polarization direction in a same row and a same column, there is an interval of a same quantity of columns between antennas in a same row, the antennas in the same row are sequentially in alternate polarization directions or are in a same polarization direction, there is an interval of a same quantity of rows between every two adjacent rows that include antennas, and antennas in every two adjacent rows that include the antennas are not in a same column.

With reference to the first possible implementation manner of the fourth aspect, in a sixth possible implementation manner, the first preset antennas further include embodiments where antennas at each of four corners of the antenna array that includes the first preset antennas are in pairs.

With reference to the first possible implementation manner of the fourth aspect, in a seventh possible implementation manner, the first preset antennas further include embodiments where there is one antenna at each of four corners of the antenna array that includes the first preset antennas, and quantities of antennas in two polarization directions are the same.

With reference to the first possible implementation manner of the fourth aspect, in an eighth possible implementation manner, the first preset antennas further include embodiments where only one pair of antennas exists, antennas in the pair are in a same row and a same column, there is an interval of a same quantity of columns between antennas in one polarization direction in the row, and there is an interval of a same quantity of rows between antennas in the other polarization direction in the column.

With reference to the first possible implementation manner of the fourth aspect, in a ninth possible implementation manner, the first preset antennas further include embodiments where only one pair of antennas exists, antennas in the pair are in a same row and a same column, there is an interval of a same quantity of columns between antennas in one polarization direction in the row, and a column in which any one of the antennas in the polarization direction is located includes antennas in the other polarization direction at an equal interval of a same quantity of rows; or only one pair of antennas exists, antennas in the pair are in a same row and a same column, there is an interval of a same quantity of rows between antennas in one polarization direction in the column, and a row in which any one of the antennas in the polarization direction is located includes antennas in the other polarization direction at an equal interval of a same quantity of columns.

With reference to the first possible implementation manner of the fourth aspect, in a tenth possible implementation manner, the first preset antennas further include embodiments where there is an interval of a same quantity of columns between antennas in one polarization direction in a same row, and a column in which any one of the antennas in the polarization direction is located includes antennas in the other polarization direction at an equal interval of a same quantity of rows; or there is an interval of a same quantity of rows between antennas in one polarization direction in a same column, and a row in which any one of the antennas in the polarization direction is located includes antennas in the other polarization direction at an equal interval of a same quantity of columns.

With reference to the fourth aspect, in an eleventh possible implementation manner, when the first antenna array is a co-polarized antenna array, the preset quantity of antennas include embodiments where at least two antennas are not in a same row, and at least two antennas are not in a same column.

With reference to the eleventh possible implementation manner of the fourth aspect, in a twelfth possible implementation manner, the first preset antennas further include embodiments where all the antennas are in different rows and different columns.

With reference to the eleventh possible implementation manner of the fourth aspect, in a thirteenth possible implementation manner, the first preset antennas further include embodiments where there is an interval of a same quantity of rows between antennas in a same column, there is an interval of a same quantity of columns between every two adjacent columns that include antennas, and antennas in every two adjacent columns that include the antennas are not in a same row; or there is an interval of a same quantity of columns between antennas in a same row, there is an interval of a same quantity of rows between every two adjacent rows that include antennas, and antennas in every two adjacent rows that include the antennas are not in a same column.

With reference to the eleventh possible implementation manner of the fourth aspect, in a fourteenth possible implementation manner, the first preset antennas further include embodiments where there is one antenna at each of four corners of the antenna array that includes the first preset antennas.

With reference to the eleventh possible implementation manner of the fourth aspect, in a sixteenth possible implementation manner, the first preset antennas further include embodiments where there is an interval of a same quantity of columns between antennas in one row, and a column in which any one of the antennas in the row is located includes antennas at an equal row interval.

With reference to the fourth aspect or any one of the first to the sixteenth possible implementation manners of the fourth aspect, in a seventeenth possible implementation manner, when the second preset antennas include the first preset antennas, the antenna configuration information received by the receiving unit includes pattern information of the first preset antennas in the second preset antennas.

With reference to the fourth aspect or any one of the first to the sixteenth possible implementation manners of the fourth aspect, in an eighteenth possible implementation manner, when the second preset antennas do not include the first preset antennas, the antenna configuration information received by the receiving unit includes pattern information of the first preset antennas in the antenna array; and pattern information of the second preset antennas in the antenna array.

With reference to the fourth aspect or any one of the first to the eighteenth possible implementation manners of the fourth aspect, in a nineteenth possible implementation manner, the antenna configuration information received by the receiving unit further includes at least one of an interval between antennas and correlation coefficients between the antennas.

With reference to the fourth aspect or any one of the first to the nineteenth possible implementation manners of the fourth aspect, in a twentieth possible implementation manner, the acquiring unit includes a first acquiring subunit configured to acquire a channel matrix corresponding to the first preset antennas from the pilot signals; a second acquiring subunit configured to acquire a position relationship between the first preset antennas and the second preset antennas from the antenna configuration information; and an operation subunit configured to perform an interpolation operation according to the channel matrix that is corresponding to the first preset antennas and is acquired by the first acquiring subunit and the position relationship that is between the first preset antennas and the second preset antennas and is acquired by the second acquiring subunit, to obtain the channel state information of the second preset antennas.

With reference to the fourth aspect or any one of the first to the twentieth possible implementation manners of the fourth aspect, in a twenty-first possible implementation manner, the sending unit is configured to send, to the base station, rank information, a precoding matrix indicator, and a channel quality indicator that are of the second preset antennas.

With reference to the fourth aspect or any one of the first to the twentieth possible implementation manners of the fourth aspect, in a twenty-second possible implementation manner, the sending unit is configured to send, to the base station, rank information, a precoding matrix indicator, and a channel quality indicator that are of the second preset antennas, and send, to the base station, rank information, a precoding matrix indicator, and a channel quality indicator that are of the first preset antennas.

With reference to the fourth aspect or any one of the first to the twentieth possible implementation manners of the fourth aspect, in a twenty-third possible implementation manner, the sending unit is configured to send, to the base station, rank information of the second preset antennas, a structure of a differential codebook of precoding matrix indicators of the first preset antennas and the second preset antennas, and a channel quality indicator of the second preset antennas, and send, to the base station, rank information, the precoding matrix indicator, and a channel quality indicator that are of the first preset antennas; or send, to the base station, rank information of the second preset antennas, a precoding matrix indicator of the second preset antennas, and a differential channel quality indicator of the first preset antennas and the second preset antennas, and send, to the base station, rank information, a precoding matrix indicator, and a channel quality indicator that are of the first preset antennas; or send, to the base station, rank information of the second preset antennas, a structure of a differential codebook of precoding matrix indicators of the first preset antennas and the second preset antennas, and a differential channel quality indicator of the first preset antennas and the second preset antennas, and send, to the base station, rank information, the precoding matrix indicator, and a channel quality indicator that are of the first preset antennas.

According to a fifth aspect, a base station is provided, including a processor, a receiver, a transmitter, a memory, and a bus, where the processor, the receiver, the transmitter, and the memory are connected to each other using the bus, and the memory is configured to store data to be processed by the processor; the processor is configured to map first preset antennas in an antenna array to pilot signals; the transmitter is configured to send the pilot signals and the antenna configuration information to a terminal, where the antenna configuration information includes pattern information of the first preset antennas and pattern information of second preset antennas; and the receiver is configured to receive channel state information of the second preset antennas that is fed back by the terminal; where the first preset antennas and the second preset antennas are in the same antenna array, and the first preset antennas are different from the second preset antennas.

With reference to the fifth aspect, in a first possible implementation manner, when the antenna array is a dual-polarized antenna array, the first preset antennas include embodiments where at least two antennas are not in a same row, at least two antennas are not in a same column, and at least two antennas are in different polarization directions.

With reference to the first possible implementation manner of the fifth aspect, in a second possible implementation manner, the first preset antennas further include embodiments where the antennas are in pairs, antennas in each pair are in a same row and a same column, and all the antenna pairs are in different rows and different columns.

With reference to the first possible implementation manner of the fifth aspect, in a third possible implementation manner, the first preset antennas further include embodiments where there is an antenna in only one polarization direction in a same row and a same column, a difference between quantities of antennas in two polarization directions cannot exceed 1, and all the antennas are in different rows and different columns.

With reference to the first possible implementation manner of the fifth aspect, in a fourth possible implementation manner, the first preset antennas further include embodiments where the antennas are in pairs, antennas in each pair are in a same row and a same column, there is an interval of a same quantity of rows between antenna pairs in a same column, there is an interval of a same quantity of columns between every two adjacent columns that include antennas, and antenna pairs in every two adjacent columns that include antennas are not in a same row; or the antennas are in pairs, antennas in each pair are in a same row and a same column, there is an interval of a same quantity of columns between antenna pairs in a same row, there is an interval of a same quantity of rows between every two adjacent rows that include antennas, and antenna pairs in every two adjacent rows that include antennas are not in a same column.

With reference to the first possible implementation manner of the fifth aspect, in a fifth possible implementation manner, the first preset antennas further include embodiments where there is an antenna in only one polarization direction in a same row and a same column, there is an interval of a same quantity of rows between antennas in a same column, the antennas in the same column are sequentially in alternate polarization directions or are in a same polarization direction, there is an interval of a same quantity of columns between every two adjacent columns that include antennas, and antennas in every two adjacent columns that include the antennas are not in a same row; or there is an antenna in only one polarization direction in a same row and a same column, there is an interval of a same quantity of columns between antennas in a same row, the antennas in the same row are sequentially in alternate polarization directions or are in a same polarization direction, there is an interval of a same quantity of rows between every two adjacent rows that include antennas, and antennas in every two adjacent rows that include the antennas are not in a same column.

With reference to the first possible implementation manner of the fifth aspect, in a sixth possible implementation manner, the first preset antennas further include embodiments where antennas at each of four corners of the antenna array that includes the first preset antennas are in pairs.

With reference to the first possible implementation manner of the fifth aspect, in a seventh possible implementation manner, the first preset antennas further include embodiments where there is one antenna at each of four corners of the antenna array that includes the first preset antennas, and quantities of antennas in two polarization directions are the same.

With reference to the first possible implementation manner of the fifth aspect, in an eighth possible implementation manner, the first preset antennas further include embodiments where only one pair of antennas exists, antennas in the pair are in a same row and a same column, there is an interval of a same quantity of columns between antennas in one polarization direction in the row, and there is an interval of a same quantity of rows between antennas in the other polarization direction in the column.

With reference to the first possible implementation manner of the fifth aspect, in a ninth possible implementation manner, the first preset antennas further include embodiments where only one pair of antennas exists, antennas in the pair are in a same row and a same column, there is an interval of a same quantity of columns between antennas in one polarization direction in the row, and a column in which any one of the antennas in the polarization direction is located includes antennas in the other polarization direction at an equal interval of a same quantity of rows; or only one pair of antennas exists, antennas in the pair are in a same row and a same column, there is an interval of a same quantity of rows between antennas in one polarization direction in the column, and a row in which any one of the antennas in the polarization direction is located includes antennas in the other polarization direction at an equal interval of a same quantity of columns.

With reference to the first possible implementation manner of the fifth aspect, in a tenth possible implementation manner, the first preset antennas further include embodiments where there is an interval of a same quantity of columns between antennas in one polarization direction in a same row, and a column in which any one of the antennas in the polarization direction is located includes antennas in the other polarization direction at an equal interval of a same quantity of rows; or there is an interval of a same quantity of rows between antennas in one polarization direction in a same column, and a row in which any one of the antennas in the polarization direction is located includes antennas in the other polarization direction at an equal interval of a same quantity of columns.

With reference to the fifth aspect, in an eleventh possible implementation manner, when the antenna array is a co-polarized antenna array, when the first antenna array is a co-polarized antenna array, the preset quantity of antennas include embodiments where at least two antennas are not in a same row, and at least two antennas are not in a same column.

With reference to the eleventh possible implementation manner of the fifth aspect, in a twelfth possible implementation manner, the first preset antennas further include embodiments where all the antennas are in different rows and different columns.

With reference to the eleventh possible implementation manner of the fifth aspect, in a thirteenth possible implementation manner, the first preset antennas further include embodiments where there is an interval of a same quantity of rows between antennas in a same column, there is an interval of a same quantity of columns between every two adjacent columns that include antennas, and antennas in every two adjacent columns that include the antennas are not in a same row; or there is an interval of a same quantity of columns between antennas in a same row, there is an interval of a same quantity of rows between every two adjacent rows that include antennas, and antennas in every two adjacent rows that include the antennas are not in a same column.

With reference to the eleventh possible implementation manner of the fifth aspect, in a fourteenth possible implementation manner, the first preset antennas further include embodiments where there is one antenna at each of four corners of the antenna array that includes the first preset antennas.

With reference to the eleventh possible implementation manner of the fifth aspect, in a fifteenth possible implementation manner, the first preset antennas further include embodiments where there is an interval of a same quantity of columns between antennas in one row, and a column in which any one of the antennas in the row is located includes antennas at an equal row interval.

With reference to the fifth aspect and the first to the fifteenth possible implementation manners of the fifth aspect, in a sixteenth possible implementation manner, when the second preset antennas include the first preset antennas, the antenna configuration information sent by the transmitter includes pattern information of the first preset antennas in the second preset antennas.

With reference to the fifth aspect and the first to the fifteenth possible implementation manners of the fifth aspect, in a seventeenth possible implementation manner, when the second preset antennas do not include the first preset antennas, the antenna configuration information sent by the transmitter includes pattern information of the first preset antennas in the antenna array; and pattern information of the second preset antennas in the antenna array.

With reference to the fifth aspect or any one of possible implementation manners of the fifth aspect, in an eighteenth possible implementation manner, the antenna configuration information sent by the transmitter further includes at least one of an interval between antennas and correlation coefficients between the antennas.

According to a sixth aspect, a terminal is provided, including a processor, a receiver, a transmitter, a memory, and a bus, where the processor, the receiver, the transmitter, and the memory are connected to each other using the bus, and the memory is configured to store data to be processed by the processor; the receiver is configured to receive pilot signals and the antenna configuration information that are sent by a base station, where the pilot signals are pilot signals to which first preset antennas in an antenna array are mapped, and the antenna configuration information includes pattern information of the first preset antennas and pattern information of second preset antennas; the processor is configured to obtain channel state information of the second preset antennas by means of calculation according to the pilot signals and the antenna configuration information; and the transmitter is configured to send the channel state information of the second preset antennas to the base station; where the first preset antennas and the second preset antennas are in the same antenna array, and the first preset antennas are different from the second preset antennas.

With reference to the sixth aspect, in a first possible implementation manner, when the antenna array is a dual-polarized antenna array, the first preset antennas include embodiments where at least two antennas are not in a same row, at least two antennas are not in a same column, and at least two antennas are in different polarization directions.

With reference to the first possible implementation manner of the sixth aspect, in a second possible implementation manner, the first preset antennas further include embodiments where the antennas are in pairs, antennas in each pair are in a same row and a same column, and all the antenna pairs are in different rows and different columns.

With reference to the first possible implementation manner of the sixth aspect, in a third possible implementation manner, the first preset antennas further include embodiments where there is an antenna in only one polarization direction in a same row and a same column, a difference between quantities of antennas in two polarization directions cannot exceed 1, and all the antennas are in different rows and different columns.

With reference to the first possible implementation manner of the sixth aspect, in a fourth possible implementation manner, the first preset antennas further include embodiments where the antennas are in pairs, antennas in each pair are in a same row and a same column, there is an interval of a same quantity of rows between antenna pairs in a same column, there is an interval of a same quantity of columns between every two adjacent columns that include antennas, and antenna pairs in every two adjacent columns that include antennas are not in a same row; or the antennas are in pairs, antennas in each pair are in a same row and a same column, there is an interval of a same quantity of columns between antenna pairs in a same row, there is an interval of a same quantity of rows between every two adjacent rows that include antennas, and antenna pairs in every two adjacent rows that include antennas are not in a same column.

With reference to the first possible implementation manner of the sixth aspect, in a fifth possible implementation manner, the first preset antennas further include embodiments where there is an antenna in only one polarization direction in a same row and a same column, there is an interval of a same quantity of rows between antennas in a same column, the antennas in the same column are sequentially in alternate polarization directions or are in a same polarization direction, there is an interval of a same quantity of columns between every two adjacent columns that include antennas, and antennas in every two adjacent columns that include the antennas are not in a same row; or there is an antenna in only one polarization direction in a same row and a same column, there is an interval of a same quantity of columns between antennas in a same row, the antennas in the same row are sequentially in alternate polarization directions or are in a same polarization direction, there is an interval of a same quantity of rows between every two adjacent rows that include antennas, and antennas in every two adjacent rows that include the antennas are not in a same column.

With reference to the first possible implementation manner of the sixth aspect, in a sixth possible implementation manner, the first preset antennas further include embodiments where antennas at each of four corners of the antenna array that includes the first preset antennas are in pairs.

With reference to the first possible implementation manner of the sixth aspect, in a seventh possible implementation manner, the first preset antennas further include embodiments where there is one antenna at each of four corners of the antenna array that includes the first preset antennas, and quantities of antennas in two polarization directions are the same.

With reference to the first possible implementation manner of the sixth aspect, in an eighth possible implementation manner, the first preset antennas further include embodiments where only one pair of antennas exists, antennas in the pair are in a same row and a same column, there is an interval of a same quantity of columns between antennas in one polarization direction in the row, and there is an interval of a same quantity of rows between antennas in the other polarization direction in the column.

With reference to the first possible implementation manner of the sixth aspect, in a ninth possible implementation manner, the first preset antennas further include embodiments where only one pair of antennas exists, antennas in the pair are in a same row and a same column, there is an interval of a same quantity of columns between antennas in one polarization direction in the row, and a column in which any one of the antennas in the polarization direction is located includes antennas in the other polarization direction at an equal interval of a same quantity of rows; or only one pair of antennas exists, antennas in the pair are in a same row and a same column, there is an interval of a same quantity of rows between antennas in one polarization direction in the column, and a row in which any one of the antennas in the polarization direction is located includes antennas in the other polarization direction at an equal interval of a same quantity of columns.

With reference to the first possible implementation manner of the sixth aspect, in a tenth possible implementation manner, the first preset antennas further include embodiments where there is an interval of a same quantity of columns between antennas in one polarization direction in a same row, and a column in which any one of the antennas in the polarization direction is located includes antennas in the other polarization direction at an equal interval of a same quantity of rows; or there is an interval of a same quantity of rows between antennas in one polarization direction in a same column, and a row in which any one of the antennas in the polarization direction is located includes antennas in the other polarization direction at an equal interval of a same quantity of columns.

With reference to the sixth aspect, in an eleventh possible implementation manner, when the first antenna array is a co-polarized antenna array, the preset quantity of antennas include embodiments where at least two antennas are not in a same row, and at least two antennas are not in a same column.

With reference to the eleventh possible implementation manner of the sixth aspect, in a twelfth possible implementation manner, the first preset antennas further include embodiments where all the antennas are in different rows and different columns.

With reference to the eleventh possible implementation manner of the sixth aspect, in a thirteenth possible implementation manner, the first preset antennas further include embodiments where there is an interval of a same quantity of rows between antennas in a same column, there is an interval of a same quantity of columns between every two adjacent columns that include antennas, and antennas in every two adjacent columns that include the antennas are not in a same row; or there is an interval of a same quantity of columns between antennas in a same row, there is an interval of a same quantity of rows between every two adjacent rows that include antennas, and antennas in every two adjacent rows that include the antennas are not in a same column.

With reference to the eleventh possible implementation manner of the sixth aspect, in a fourteenth possible implementation manner, the first preset antennas further include embodiments where there is one antenna at each of four corners of the antenna array that includes the first preset antennas.

With reference to the eleventh possible implementation manner of the sixth aspect, in a sixteenth possible implementation manner, the first preset antennas further include embodiments where there is an interval of a same quantity of columns between antennas in one row, and a column in which any one of the antennas in the row is located includes antennas at an equal row interval.

With reference to the sixth aspect or any one of the first to the sixteenth possible implementation manners of the sixth aspect, in a seventeenth possible implementation manner, when the second preset antennas include the first preset antennas, the antenna configuration information received by the receiver includes pattern information of the first preset antennas in the second preset antennas.

With reference to the sixth aspect or any one of the first to the sixteenth possible implementation manners of the sixth aspect, in an eighteenth possible implementation manner, when the second preset antennas do not include the first preset antennas, the antenna configuration information received by the receiver includes pattern information of the first preset antennas in the antenna array; and pattern information of the second preset antennas in the antenna array.

With reference to the sixth aspect or any one of the first to the eighteenth possible implementation manners of the sixth aspect, in a nineteenth possible implementation manner, the antenna configuration information received by the receiver further includes at least one of an interval between antennas and correlation coefficients between the antennas.

With reference to the sixth aspect or any one of the first to the nineteenth possible implementation manners of the sixth aspect, in a twentieth possible implementation manner, the processor is configured to acquire a channel matrix corresponding to the first preset antennas from the pilot signals; acquire a position relationship between the first preset antennas and the second preset antennas from the antenna configuration information; and perform an interpolation operation according to the channel matrix corresponding to the first preset antennas and the position relationship between the first preset antennas and the second preset antennas, to obtain the channel state information of the second preset antennas.

With reference to the sixth aspect or any one of the first to the twentieth possible implementation manners of the sixth aspect, in a twenty-first possible implementation manner, the transmitter is configured to send, to the base station, rank information, a precoding matrix indicator, and a channel quality indicator that are of the second preset antennas.

With reference to the sixth aspect or any one of the first to the twentieth possible implementation manners of the sixth aspect, in a twenty-second possible implementation manner, the sending the channel state information of the second preset antennas to the transmitter is configured to send, to the base station, rank information, a precoding matrix indicator, and a channel quality indicator that are of the second preset antennas, and send, to the base station, rank information, a precoding matrix indicator, and a channel quality indicator that are of the first preset antennas.

With reference to the sixth aspect or any one of the first to the twentieth possible implementation manners of the sixth aspect, in a twenty-third possible implementation manner, the sending the channel state information of the second preset antennas to the transmitter is configured to send, to the base station, rank information of the second preset antennas, a structure of a differential codebook of precoding matrix indicators of the first preset antennas and the second preset antennas, and a channel quality indicator of the second preset antennas, and send, to the base station, rank information, the precoding matrix indicator, and a channel quality indicator that are of the first preset antennas; or send, to the base station, rank information of the second preset antennas, a precoding matrix indicator of the second preset antennas, and a differential channel quality indicator of the first preset antennas and the second preset antennas, and send, to the base station, rank information, a precoding matrix indicator, and a channel quality indicator that are of the first preset antennas; or send, to the base station, rank information of the second preset antennas, a structure of a differential codebook of precoding matrix indicators of the first preset antennas and the second preset antennas, and a differential channel quality indicator of the first preset antennas and the second preset antennas, and send, to the base station, rank information, the precoding matrix indicator, and a channel quality indicator that are of the first preset antennas.

According to a seventh aspect, a communications system is provided, including a terminal and a base station that communicate with each other, where the base station is the base station described in the third aspect, and the terminal is the terminal described in the fourth aspect; or the base station is the base station described in the fifth aspect, and the terminal is the terminal described in the sixth aspect.

In the foregoing solutions for acquiring channel information, a base station selects first preset antennas from an antenna array, maps the first preset antennas to pilot signals, and sends the pilot signals and the antenna configuration information to the terminal, and the terminal acquires channel state information of second preset antennas according to the pilot signals and the antenna configuration information, and feeds back the channel state information of the second preset antennas to the base station. In this case, mapping, by the base station, all antennas in the antenna array to pilot signals is avoided, which reduces pilot overheads.

BRIEF DESCRIPTION OF DRAWINGS

To describe the technical solutions in the embodiments of the present disclosure and in the prior art more clearly, the following briefly introduces the accompanying drawings required for describing the embodiments and the prior art.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
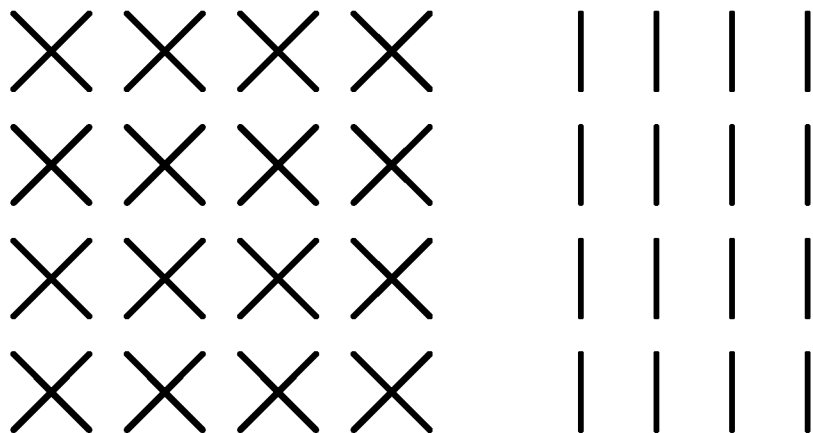
FIG. 1 is a schematic diagram of an antenna array provided in the prior art.
Figure 2:
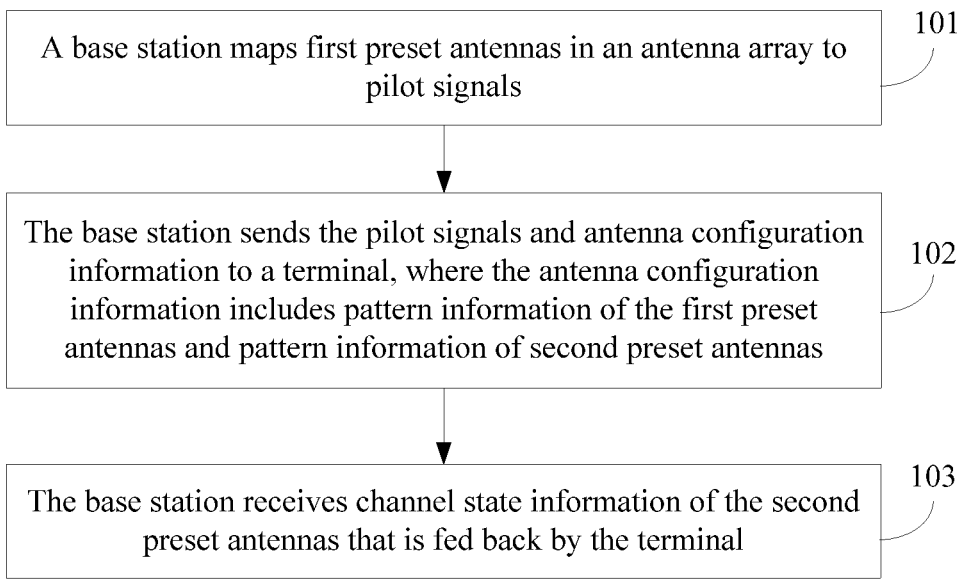
FIG. 2 is a schematic flowchart of a method for acquiring channel information according to an embodiment of the present disclosure.

Referring to FIG. 2, an embodiment of the present disclosure provides a method for acquiring channel information by a base station, including the following steps.

Step 101. The base station maps first preset antennas in an antenna array to pilot signals.

The first preset antennas may be preset by the base station, or a terminal may feed back setting information of the first preset antennas to the base station, or the base station sends setting information of the first preset antennas to a terminal.

Figure 3:
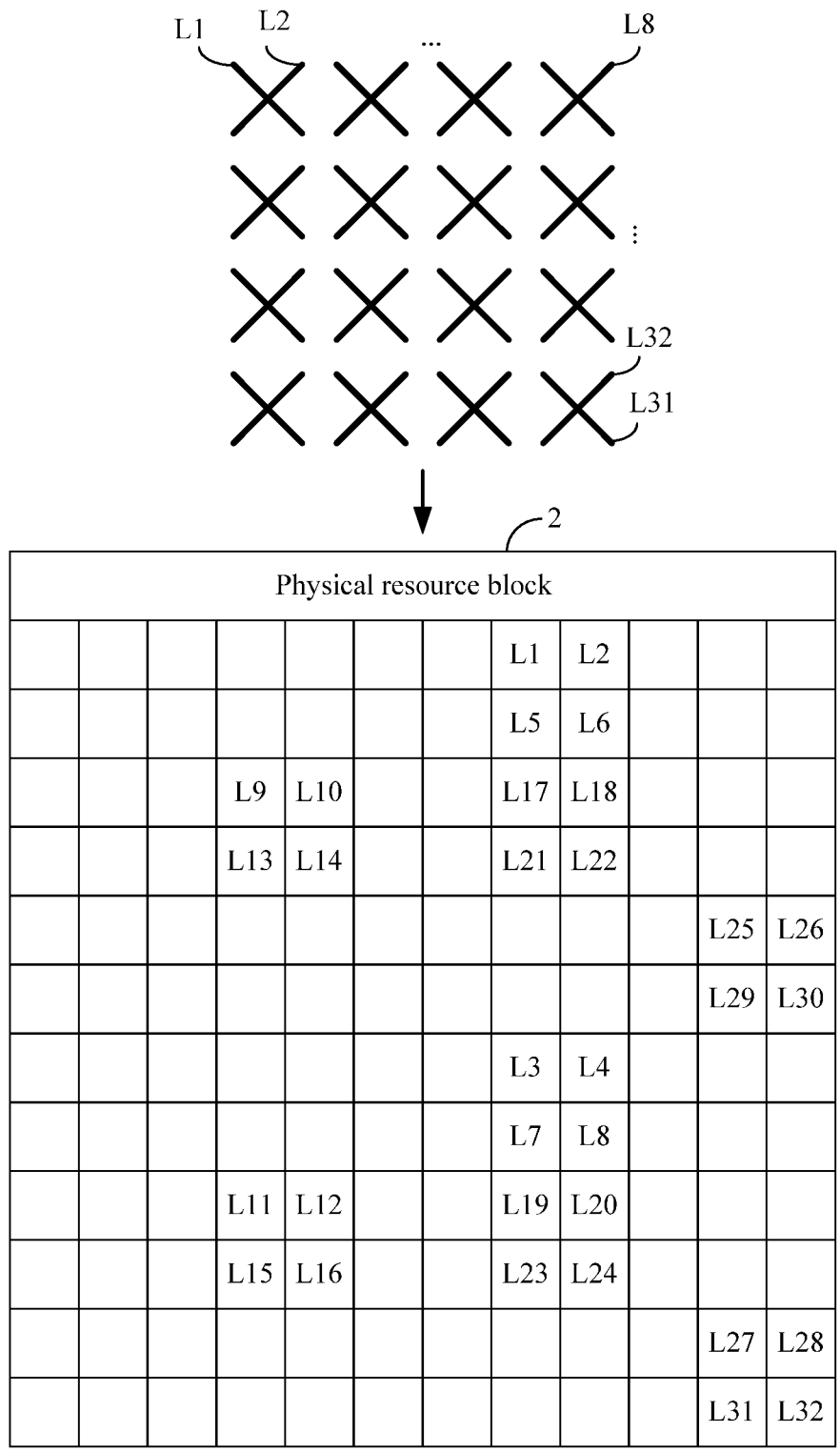
FIG. 3 is a schematic diagram of an antenna array mapping method according to an embodiment of the present disclosure.

A quantity of first preset antennas is less than a quantity of all antennas or a second preset quantity of antennas in the antenna array. Mapping a preset quantity of antennas to pilot signals needs to be performed using a physical resource block 2. Referring to FIG. 3, an antenna array in FIG. 3 is a dual-polarized antenna array and includes 32 antennas (L1, L2, . . . , and L32) in total. A physical resource block 2 in FIG. 3 can be divided into multiple physical resource units, where information about each antenna may be mapped to a corresponding physical resource unit. A number on each physical resource unit in FIG. 3 represents a corresponding antenna, and these physical resource units can implement antenna mapping, and can also implement data transmission. When the base station is mapping antennas to pilot signals, if all the antennas in the antenna array are selected, a large quantity of physical resource units are occupied. In this case, a quantity of physical resource units for data transmission becomes smaller, which causes deterioration of data transmission performance of the base station. In this embodiment of the present disclosure, some antennas in the antenna array are selected for mapping, so that relatively fewer physical resource units are occupied, which reduces impact on the data transmission performance of the base station.

When the antenna array is a dual-polarized antenna array, the first preset antennas include embodiments where at least two antennas are not in a same row, at least two antennas are not in a same column, and at least two antennas are in different polarization directions. That at least two antennas are not in a same row may a difference in signal transmission with antennas in different rows. Likewise, that at least two antennas are not in a same column may reflect a difference in signal transmission with antennas in different columns, and that at least two antennas are in different polarization directions may reflect a difference in signal transmission with antennas in different polarization directions.

Optionally, when the antenna is a co-polarized antenna array, the first preset antennas include embodiments where at least two antennas are not in a same row, and at least two antennas are not in a same column. That at least two antennas are not in a same row may reflect a difference in signal transmission with antennas in different rows. Likewise, that at least two antennas are not in a same column may reflect a difference in signal transmission with antennas in different columns.

Step 102. The base station sends the pilot signals and antenna configuration information to a terminal, where the antenna configuration information includes pattern information of the first preset antennas and pattern information of second preset antennas.

The first preset antennas and the second preset antennas are in the same antenna array, and the first preset antennas are different from the second preset antennas.

The terminal may obtain a position relationship between the first preset antennas and the second preset antennas according to the configuration information, and can perform an interpolation operation according to the position relationship, to obtain channel state information of the second preset antennas.

When the second preset antennas include the first preset antennas, the antenna configuration information includes pattern information of the first preset antennas in the second preset antennas.

Optionally, when the second preset antennas do not include the first preset antennas, the antenna configuration information includes pattern information of the first preset antennas in the antenna array; and pattern information of the second preset antennas in the antenna array.

Further, the antenna configuration information further includes at least one of an interval between antennas and correlation coefficients between the antennas.

The configuration information carries the interval between the antennas or the correlation coefficients between the antennas, so that the terminal can obtain the channel state information of the second preset antennas more exactly.

Step 103. The base station receives channel state information of the second preset antennas that is fed back by the terminal.

The base station can configure corresponding transmit antennas for the terminal according to the received channel state information of the second preset antennas.

In the foregoing embodiment, a base station selects first preset antennas from an antenna array, maps the first preset antennas to pilot signals, and sends the pilot signals and the antenna configuration information to the terminal, and the terminal acquires channel state information of second preset antennas according to the pilot signals and the antenna configuration information, and feeds back the channel state information of the second preset antennas to the base station. In this case, mapping, by the base station, all antennas in the antenna array to pilot signals is avoided, which reduces pilot overheads.

Figure 4:
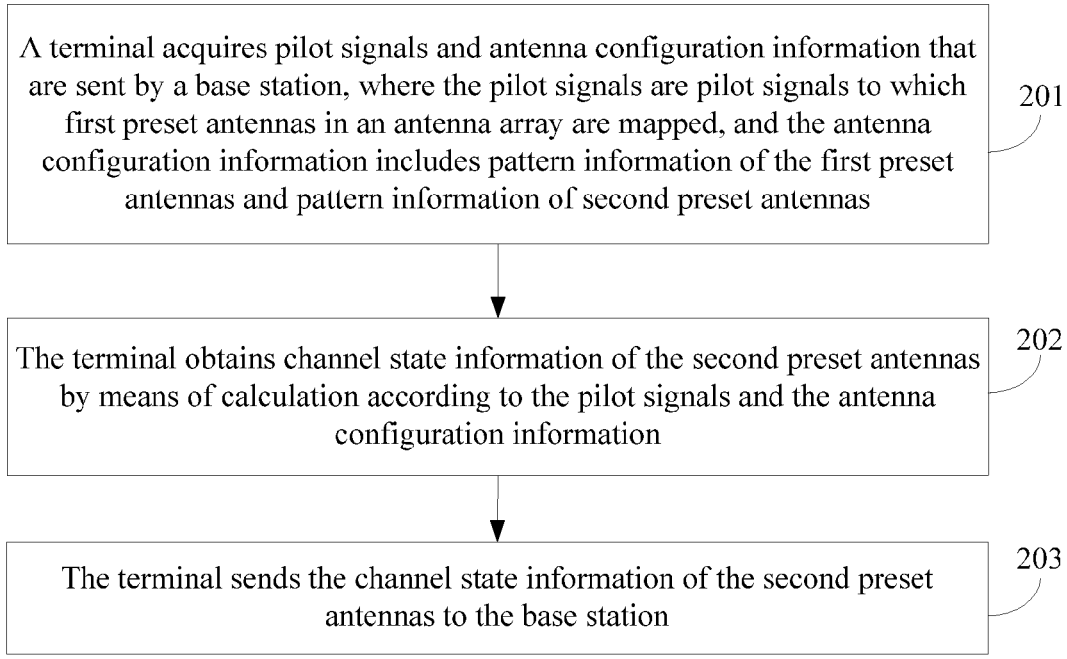
FIG. 4 is a schematic flowchart of a method for acquiring channel information according to another embodiment of the present disclosure.

Referring to FIG. 4, an embodiment of the present disclosure provides a method for acquiring channel information by a terminal, including the following steps.

Step 201. The terminal acquires pilot signals and antenna configuration information that are sent by a base station, where the pilot signals are pilot signals to which first preset antennas in an antenna array are mapped, and the antenna configuration information includes pattern information of the first preset antennas and pattern information of second preset antennas.

The first preset antennas and the second preset antennas are in the same antenna array, and the first preset antennas are different from the second preset antennas.

The terminal may obtain a position relationship between the first preset antennas and the second preset antennas according to the configuration information, and can perform an interpolation operation according to the position relationship, to obtain channel state information of the second preset antennas.

When the second preset antennas include the first preset antennas, the antenna configuration information includes pattern information of the first preset antennas in the second preset antennas.

Optionally, when the second preset antennas do not include the first preset antennas, the antenna configuration information includes pattern information of the first preset antennas in the antenna array; and pattern information of the second preset antennas in the antenna array.

Further, the antenna configuration information further includes at least one of an interval between antennas and correlation coefficients between the antennas.

The configuration information carries the interval between the antennas or the correlation coefficients between the antennas, so that the terminal can obtain the channel state information of the second preset antennas more exactly.

Step 202. The terminal obtains channel state information of the second preset antennas by means of calculation according to the pilot signals and the antenna configuration information.

The terminal acquires a channel matrix corresponding to the first preset antennas from the pilot signals, acquires the position relationship between the first preset antennas and the second preset antennas from the antenna configuration information, and performs an interpolation operation according to the channel matrix corresponding to the first preset antennas and the position relationship between the first preset antennas and the second preset antennas, to obtain the channel state information of the second preset antennas.

Channel state information of an antenna includes rank information, a precoding matrix indicator, and a channel quality indicator that are of the antenna.

Step 203. The terminal sends the channel state information of the second preset antennas to the base station.

The terminal sends, to the base station, rank information, a precoding matrix indicator, and a channel quality indicator that are of the second preset antennas.

Optionally, rank information, a precoding matrix indicator, and a channel quality indicator that are of the second preset antennas are sent to the base station, and rank information, a precoding matrix indicator, and a channel quality indicator that are of the first preset antennas are sent to the base station. In this case, the channel state information of the first preset antennas can be acquired exactly.

Optionally, rank information of the second preset antennas, a structure of a differential codebook of precoding matrix indicators of the first preset antennas and the second preset antennas, and a channel quality indicator of the second preset antennas are sent to the base station, and rank information, the precoding matrix indicator, and a channel quality indicator that are of the first preset antennas are sent to the base station; or rank information of the second preset antennas, a precoding matrix indicator of the second preset antennas, and a differential channel quality indicator of the first preset antennas and the second preset antennas are sent to the base station, and rank information, a precoding matrix indicator, and a channel quality indicator that are of the first preset antennas are sent to the base station; or rank information of the second preset antennas, a structure of a differential codebook of precoding matrix indicators of the first preset antennas and the second preset antennas, and a differential channel quality indicator of the first preset antennas and the second preset antennas are sent to the base station, and rank information, the precoding matrix indicator, and a channel quality indicator that are of the first preset antennas are sent to the base station.

The base station can obtain the precoding matrix indicator of the second preset antennas using the foregoing structure of the differential codebook of the precoding matrix indicators of the first preset antennas and the second preset antennas. Likewise, the base station can obtain the channel quality indicator of the second preset antennas using the foregoing differential channel quality indicator of the first preset antennas and the second preset antennas. The structure of the differential codebook of the precoding matrix indicators of the first preset antennas and the second preset antennas and the differential channel quality indicator of the first preset antennas and the second preset antennas occupy relatively fewer resources; therefore, in this case, pilot overheads can be reduced.

In the foregoing embodiment, a terminal receives pilot signals to which first preset antennas are mapped, where the first preset antennas are selected by a base station from an antenna array; also receives the antenna configuration information; acquires channel state information of second preset antennas according to the pilot signals and the antenna configuration information; and feeds back the channel state information of the second preset antennas to the base station. In this case, mapping, by the base station, all antennas in the antenna array to pilot signals is avoided, which reduces pilot overheads.

Figure 5:
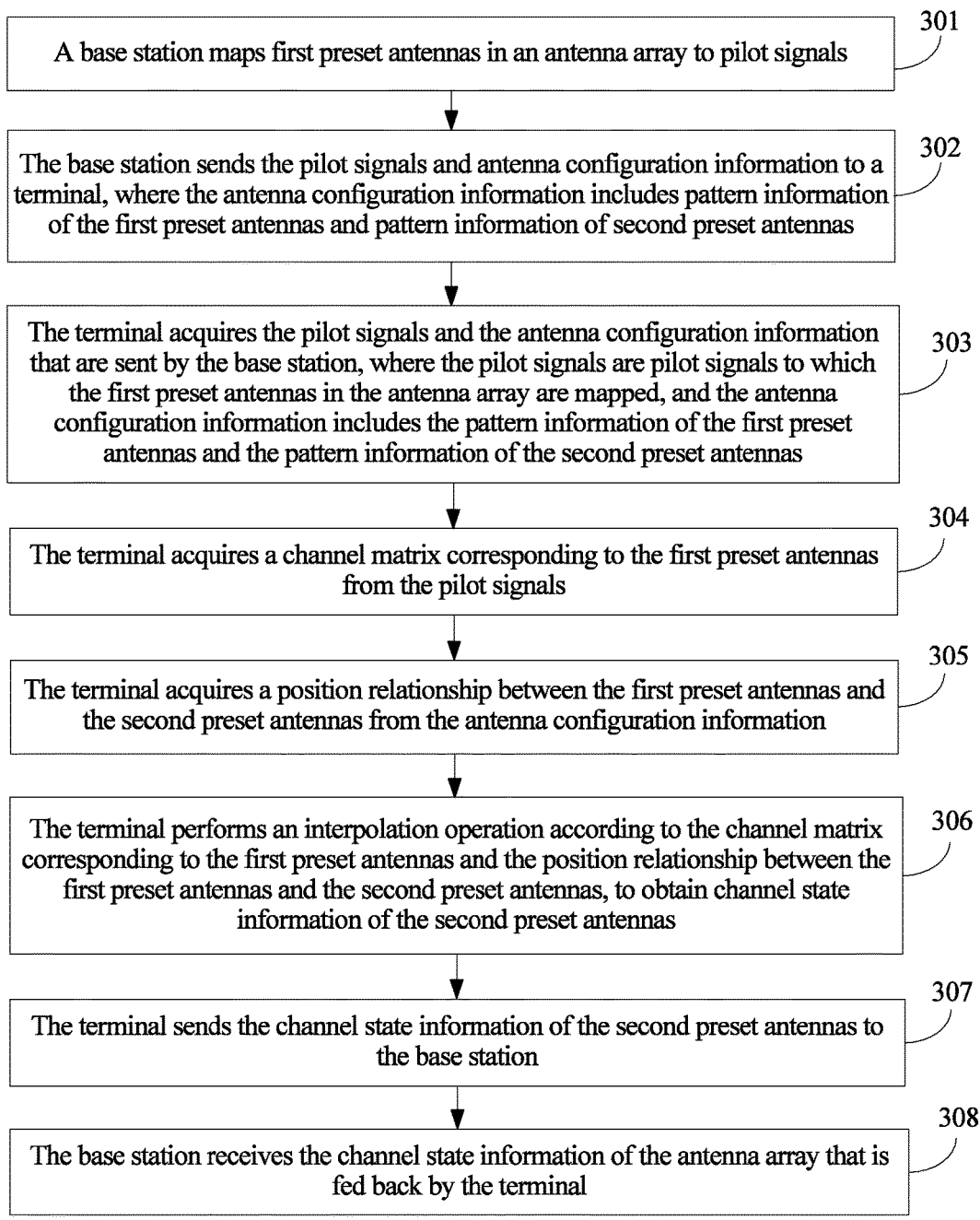
FIG. 5 is a schematic flowchart of a method for acquiring channel information according to still another embodiment of the present disclosure.

Referring to FIG. 5, an embodiment of the present disclosure provides a method for acquiring channel information, including the following steps.

Step 301. A base station maps first preset antennas in an antenna array to pilot signals.

The first preset antennas may be preset by the base station, or a terminal may feed back setting information of the first preset antennas to the base station, or the base station sends setting information of the first preset antennas to a terminal.

When the antenna array is a dual-polarized antenna array, the first preset antennas include embodiments where at least two antennas are not in a same row, at least two antennas are not in a same column, and at least two antennas are in different polarization directions. That at least two antennas are not in a same row may reflect a difference in signal transmission with antennas in different rows. Likewise, that at least two antennas are not in a same column may reflect a difference in signal transmission with antennas in different columns, and that at least two antennas are in different polarization directions may reflect a difference in signal transmission with antennas in different polarization directions.

Figure 6:
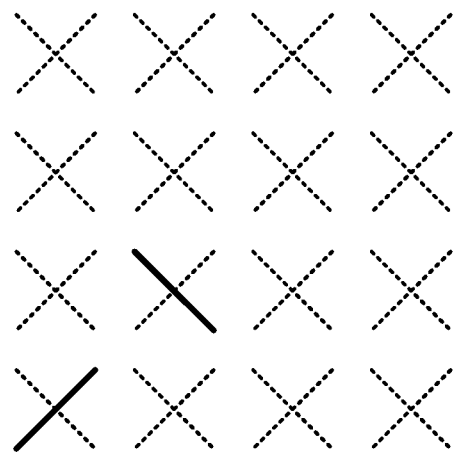
FIG. 6 is a schematic diagram of an antenna selection method according to an embodiment of the present disclosure.

Referring to FIG. 6, two solid lines represent first preset antennas, and dotted lines represent antennas except the first preset antennas. The two selected antennas can reflect a difference in signal transmission with antennas in different rows, a difference in signal transmission with antennas in different columns, and a difference in signal transmission with antennas in different polarization directions. An interpolation operation is performed according to the differences in signal transmission in the foregoing three directions and with reference to antenna configuration information, so that channel state information of second preset antennas can be obtained.

Figure 7:
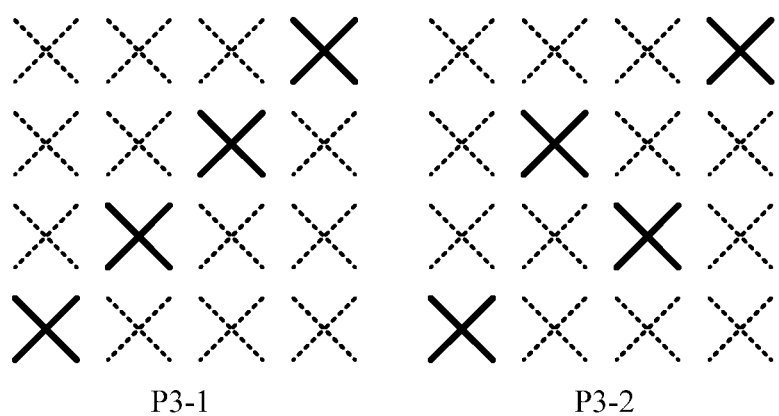
FIG. 7 is a schematic diagram of another antenna selection method according to an embodiment of the present disclosure.

Further, the first preset antennas further include embodiments where the antennas are in pairs, antennas in each pair are in a same row and a same column, and all the antenna pairs are in different rows and different columns. Referring to FIG. 7, two cases of this method are included (these two cases are numbered as P3-1 and P3-2). Solid lines represent first preset antennas, and dotted lines represent antennas except the first preset antennas, which is not described again for subsequent antenna selection figures. In the method corresponding to FIG. 7, a difference in signal transmission with multiple antennas in different rows and a difference in signal transmission with multiple antennas in different columns may be sampled, which can improve precision of an interpolation operation.

Figure 8:
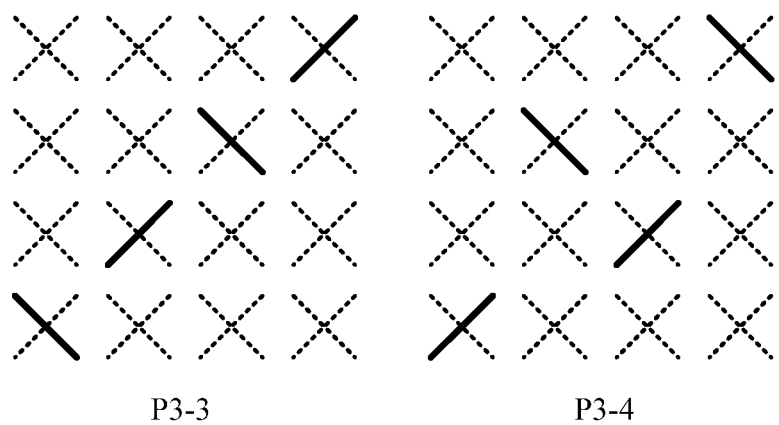
FIG. 8 is a schematic diagram of still another antenna selection method according to an embodiment of the present disclosure.

Further optionally, the first preset antennas further include embodiments where there is an antenna in only one polarization direction in a same row and a same column, a difference between quantities of antennas in two polarization directions cannot exceed 1, and all the antennas are in different rows and different columns. Referring to FIG. 8, two cases of this method are included (these two cases are numbered as P3-3 and P3-4). In the method corresponding to FIG. 8, a difference in signal transmission with multiple antennas in different rows and a difference in signal transmission with multiple antennas in different columns may be sampled, which can improve precision of an interpolation operation, and reduce a quantity of antennas mapped by the base station compared with the method corresponding to FIG. 7, thereby reducing pilot overheads.

Figure 9:
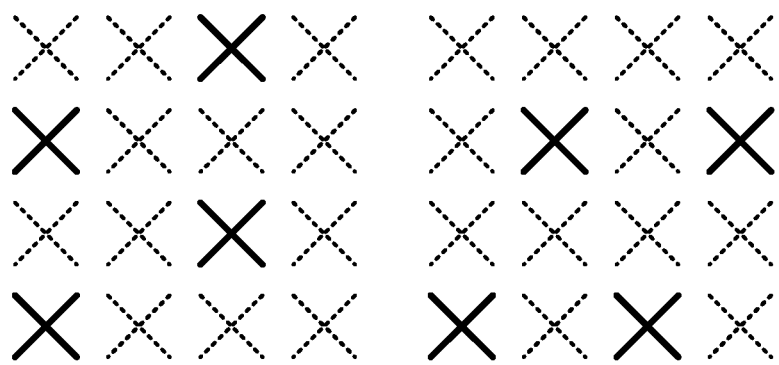
FIG. 9 is a schematic diagram of yet another antenna selection method according to an embodiment of the present disclosure.

Further optionally, the first preset antennas further include embodiments where the antennas are in pairs, antennas in each pair are in a same row and a same column, there is an interval of a same quantity of rows between antenna pairs in a same column, there is an interval of a same quantity of columns between every two adjacent columns that include antennas, and antenna pairs in every two adjacent columns that include antennas are not in a same row; or the antennas are in pairs, antennas in each pair are in a same row and a same column, there is an interval of a same quantity of columns between antenna pairs in a same row, there is an interval of a same quantity of rows between every two adjacent rows that include antennas, and antenna pairs in every two adjacent rows that include antennas are not in a same column. Referring to FIG. 9, two cases of this method are included (these two cases are numbered as P3-5 and P3-6). In the method corresponding to FIG. 9, a difference in signal transmission with multiple antennas in different rows and a difference in signal transmission with multiple antennas in different columns may be sampled, which can improve precision of an interpolation operation.

Figure 10:
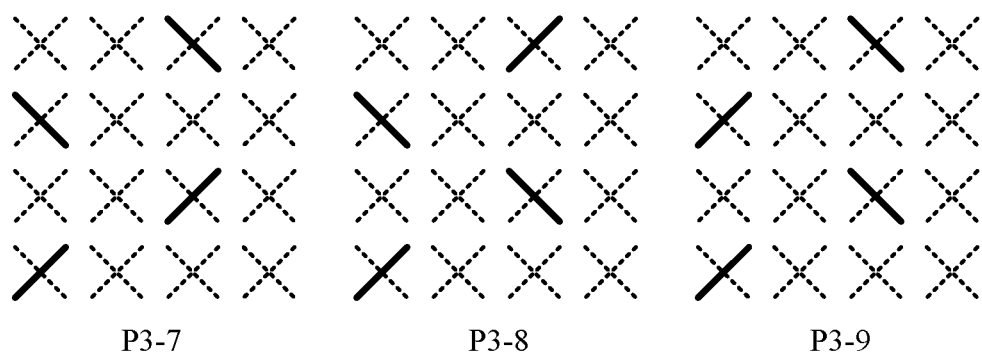
FIG. 10 is a schematic diagram of another antenna selection method according to an embodiment of the present disclosure.
Figure 10:
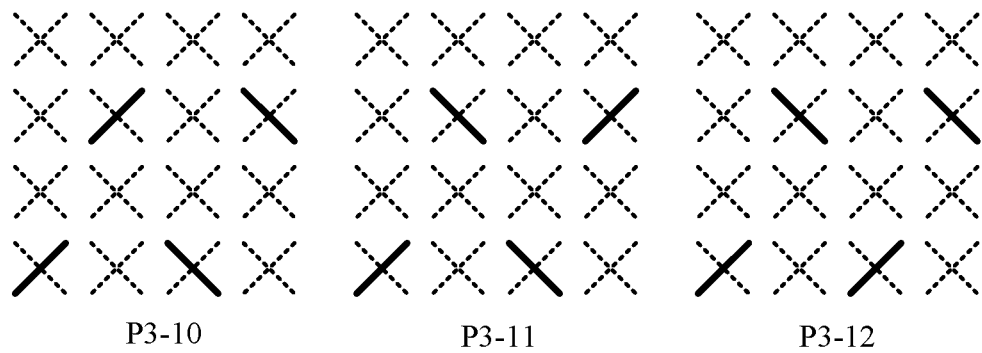

Further optionally, the first preset antennas further include embodiments where there is an antenna in only one polarization direction in a same row and a same column, there is an interval of a same quantity of rows between antennas in a same column, the antennas in the same column are sequentially in alternate polarization directions or are in a same polarization direction, there is an interval of a same quantity of columns between every two adjacent columns that include antennas, and antennas in every two adjacent columns that include the antennas are not in a same row; or there is an antenna in only one polarization direction in a same row and a same column, there is an interval of a same quantity of columns between antennas in a same row, the antennas in the same row are sequentially in alternate polarization directions or are in a same polarization direction, there is an interval of a same quantity of rows between every two adjacent rows that include antennas, and antennas in every two adjacent rows that include the antennas are not in a same column. Referring to FIG. 10, six cases of this method are included (these six cases are numbered as P3-7, P3-8, P3-9, P3-10, P3-11, and P3-12). In the method corresponding to FIG. 10, a difference in signal transmission with multiple antennas in different rows and a difference in signal transmission with multiple antennas in different columns may be sampled, which can improve precision of an interpolation operation, and reduce a quantity of antennas mapped by the base station compared with the method corresponding to FIG. 9, thereby reducing pilot overheads.

Figure 11:
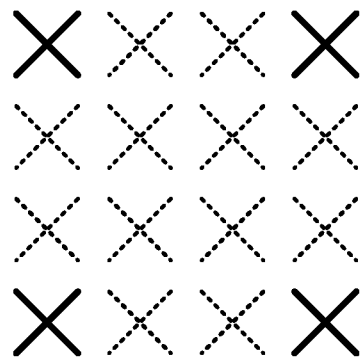
FIG. 11 is a schematic diagram of still another antenna selection method according to an embodiment of the present disclosure.

Further optionally, the first preset antennas further include embodiments where antennas at each of four corners of the antenna array that includes the first preset antennas are in pairs. Refer to FIG. 11 (one case is numbered as P3-13). In this method, the first preset antennas are distributed at corners, and the channel state information of the second preset antennas may be obtained using an interpolation algorithm in an interpolation operation, where precision of the interpolation algorithm is high.

Figure 12:
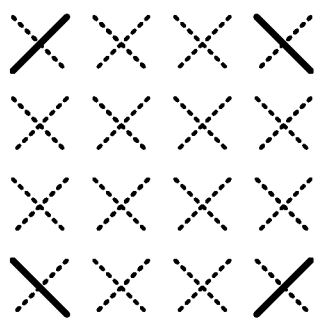
FIG. 12 is a schematic diagram of yet another antenna selection method according to an embodiment of the present disclosure.
Figure 12:
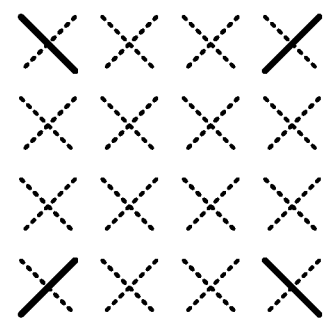
Figure 12:
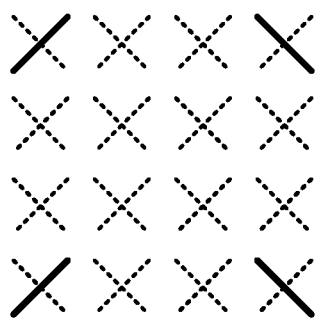

Further optionally, the first preset antennas further include embodiments where there is one antenna at each of four corners of the antenna array that includes the first preset antennas, and quantities of antennas in two polarization directions are the same. Referring to FIG. 12, three cases of this method are included (these three cases are numbered as P3-14, P3-15, and P3-16). In the method corresponding to FIG. 12, in this method, the first preset antennas are distributed at corners, and the channel state information of the second preset antennas may be obtained using an interpolation algorithm in an interpolation operation. Precision of the interpolation algorithm is high, and a quantity of antennas mapped by the base station is reduced compared with the method corresponding to FIG. 11, thereby reducing pilot overheads.

Figure 13:
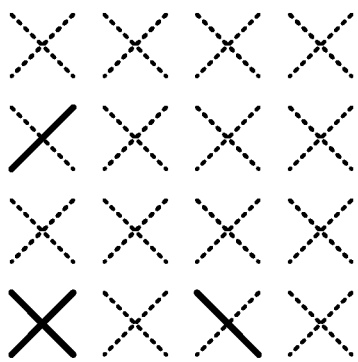
FIG. 13 is a schematic diagram of another antenna selection method according to an embodiment of the present disclosure.

Further optionally, the first preset antennas further include embodiments where only one pair of antennas exists, antennas in the pair are in a same row and a same column, there is an interval of a same quantity of columns between antennas in one polarization direction in the row, and there is an interval of a same quantity of rows between antennas in the other polarization direction in the column. Refer to FIG. 13 (one case is numbered as P3-17). In a method corresponding to FIG. 13, a difference in signal transmission with multiple antennas in different rows and a difference in signal transmission with multiple antennas in different columns may be sampled, which can improve precision of an interpolation operation.

Figure 14:
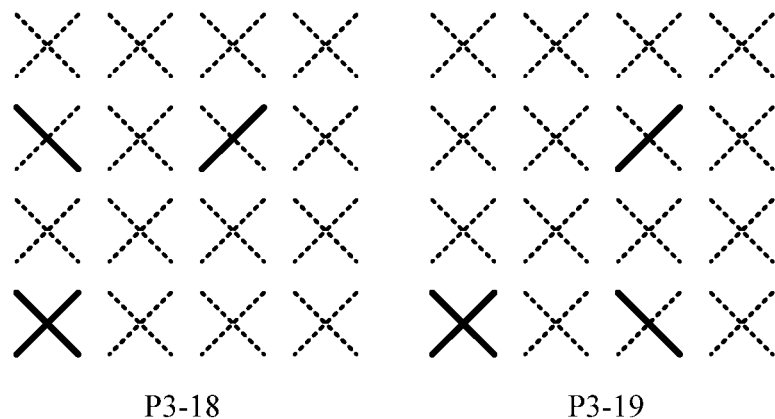
FIG. 14 is a schematic diagram of still another antenna selection method according to an embodiment of the present disclosure.

Further optionally, the first preset antennas further include embodiments where only one pair of antennas exists, antennas in the pair are in a same row and a same column, there is an interval of a same quantity of columns between antennas in one polarization direction in the row, and a column in which any one of the antennas in the polarization direction is located includes antennas in the other polarization direction at an equal interval of a same quantity of rows; or only one pair of antennas exists, antennas in the pair are in a same row and a same column, there is an interval of a same quantity of rows between antennas in one polarization direction in the column, and a row in which any one of the antennas in the polarization direction is located includes antennas in the other polarization direction at an equal interval of a same quantity of columns. Refer to FIG. 14 (these two cases are numbered as P3-18 and P3-19). In a method corresponding to FIG. 14, a difference in signal transmission with multiple antennas in different rows and a difference in signal transmission with multiple antennas in different columns may be sampled, which can improve precision of an interpolation operation.

Figure 15:
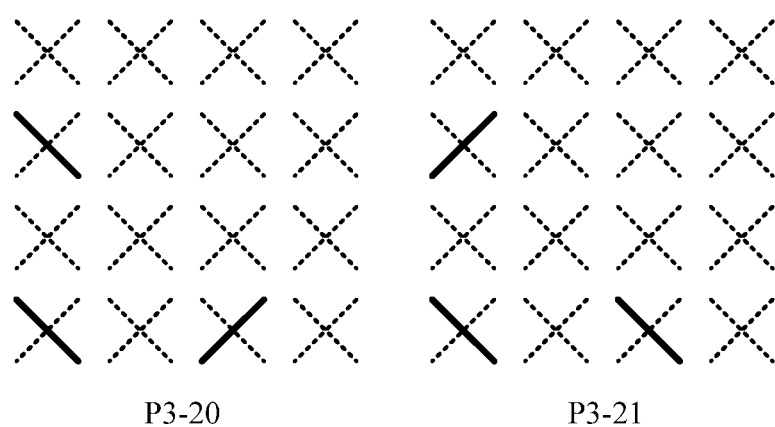
FIG. 15 is a schematic diagram of yet another antenna selection method according to an embodiment of the present disclosure.

Further optionally, the first preset antennas further include embodiments where there is an interval of a same quantity of columns between antennas in one polarization direction in a same row, and a column in which any one of the antennas in the polarization direction is located includes antennas in the other polarization direction at an equal interval of a same quantity of rows; or there is an interval of a same quantity of rows between antennas in one polarization direction in a same column, and a row in which any one of the antennas in the polarization direction is located includes antennas in the other polarization direction at an equal interval of a same quantity of columns. Refer to FIG. 15 (these two cases are numbered as P3-20 and P3-21). In a method corresponding to FIG. 15, a difference in signal transmission with multiple antennas in different rows and a difference in signal transmission with antennas in different columns may be sampled, which can improve precision of an interpolation operation, and reduce a quantity of antennas mapped by the base station compared with the method corresponding to FIG. 14, thereby reducing pilot overheads.

Certainly, alternatively, a quantity and an arrangement manner that are of preset antennas in the foregoing dual-polarized antenna array may vary. Selected first preset antennas belong to the scope of the present disclosure provided that the selected first preset antennas are different in three directions: rows, columns, and polarization directions.

Optionally, when the antenna is a co-polarized antenna array, the first preset antennas include embodiments where at least two antennas are not in a same row, and at least two antennas are not in a same column. That at least two antennas are not in a same row may reflect a difference in signal transmission with antennas in different rows. Likewise, that at least two antennas are not in a same column may reflect a difference in signal transmission with antennas in different columns.

Figure 16:
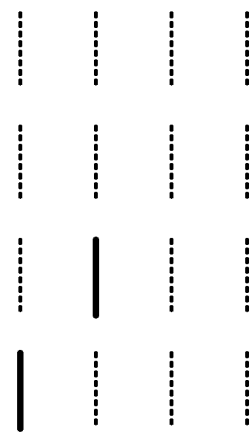
FIG. 16 is a schematic diagram of another antenna selection method according to an embodiment of the present disclosure.

Referring to FIG. 16, a difference in signal transmission with antennas in different rows and a difference in signal transmission with antennas in different columns can be reflected. An interpolation operation is performed according to the differences in signal transmission in the foregoing two directions and with reference to antenna configuration information, so that channel state information of second preset antennas can be obtained.

Figure 17:
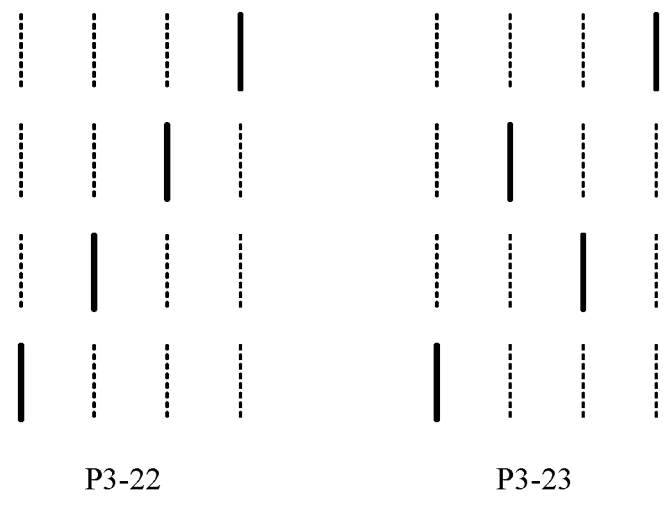
FIG. 17 is a schematic diagram of still another antenna selection method according to an embodiment of the present disclosure.

Further, the first preset antennas further include embodiments where all the antennas are in different rows and different columns. Referring to FIG. 17, two cases of this method are included (these two cases are numbered as P3-22 and P3-23). In the method corresponding to FIG. 17, a difference in signal transmission with multiple antennas in different rows and a difference in signal transmission with multiple antennas in different columns may be sampled, which can improve precision of an interpolation operation.

Figure 18:
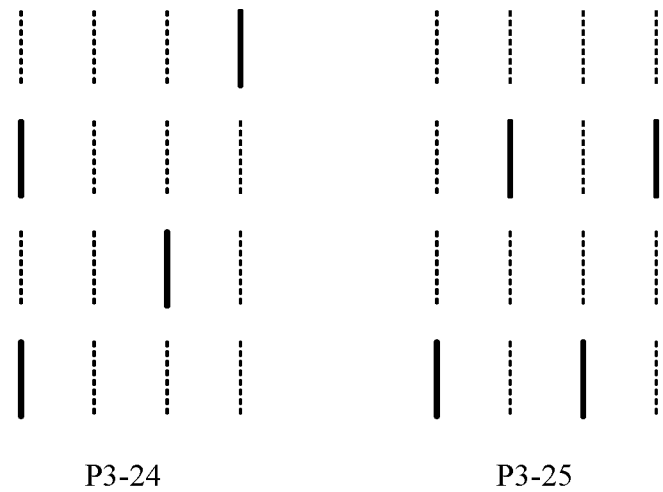
FIG. 18 is a schematic diagram of yet another antenna selection method according to an embodiment of the present disclosure.

Further optionally, the first preset antennas further include embodiments where there is an interval of a same quantity of rows between antennas in a same column, there is an interval of a same quantity of columns between every two adjacent columns that include antennas, and antennas in every two adjacent columns that include the antennas are not in a same row; or there is an interval of a same quantity of columns between antennas in a same row, there is an interval of a same quantity of rows between every two adjacent rows that include antennas, and antennas in every two adjacent rows that include the antennas are not in a same column. Referring to FIG. 18, two cases of this method are included (these two cases are numbered as P3-24 and P3-25). In the selection method corresponding to FIG. 18, a difference in signal transmission with multiple antennas in different rows and a difference in signal transmission with multiple antennas in different columns may be sampled, which can improve precision of an interpolation operation.

Figure 19:
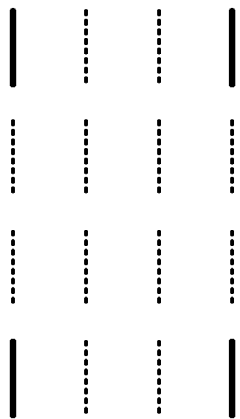
FIG. 19 is a schematic diagram of another antenna selection method according to an embodiment of the present disclosure.

Further optionally, the first preset antennas further include embodiments where there is one antenna at each of four corners of the antenna array that includes the first preset antennas. Refer to FIG. 19 (one case is numbered as P3-26). In this method, the first preset antennas are distributed at corners, and the channel state information of the second preset antennas may be obtained using an interpolation algorithm in an interpolation operation, where precision of the interpolation algorithm is high.

Figure 20:
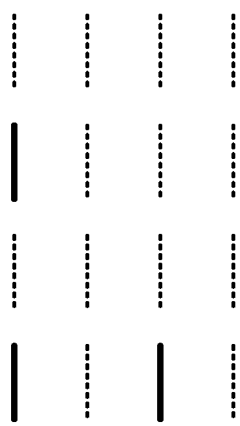
FIG. 20 is a schematic diagram of still another antenna selection method according to an embodiment of the present disclosure.

Further optionally, the first preset antennas further include embodiments where there is an interval of a same quantity of columns between antennas in one row, and a column in which any one of the antennas in the row is located includes antennas at an equal row interval. Refer to FIG. 20 (one case is numbered as P3-27). In this selection method, a difference in signal transmission with multiple antennas in different rows and a difference in signal transmission with multiple antennas in different columns may be sampled, which can improve precision of an interpolation operation.

Certainly, alternatively, a quantity and an arrangement manner that are of antennas in the foregoing co-polarized antenna array may vary. Selected first preset antennas belong to the scope of the present disclosure provided that the selected first preset antennas are different in two directions: rows and columns.

302. The base station sends the pilot signals and antenna configuration information to a terminal, where the antenna configuration information includes pattern information of the first preset antennas and pattern information of second preset antennas.

The first preset antennas and the second preset antennas are in the same antenna array, and the first preset antennas are different from the second preset antennas.

The antenna configuration information sent by the base station is already described in detail in step 102, and is not described herein again.

303. The terminal acquires the pilot signals and the antenna configuration information that are sent by the base station, where the pilot signals are pilot signals to which the first preset antennas in the antenna array are mapped, and the antenna configuration information includes the pattern information of the first preset antennas and the pattern information of the second preset antennas.

304. The terminal acquires a channel matrix corresponding to the first preset antennas from the pilot signals.

305. The terminal acquires a position relationship between the first preset antennas and the second preset antennas from the antenna configuration information.

306. The terminal performs an interpolation operation according to the channel matrix corresponding to the first preset antennas and the position relationship between the first preset antennas and the second preset antennas, to obtain channel state information of the second preset antennas.

307. The terminal sends the channel state information of the second preset antennas to the base station.

A manner of sending the channel state information of the second preset antennas is already described in detail in step 203, and is not described herein again.

308. The base station receives the channel state information of the antenna array that is fed back by the terminal.

The base station can configure corresponding transmit antennas for the terminal according to the received channel state information of the second preset antennas.

In the foregoing embodiment, a base station selects first preset antennas from an antenna array, maps the first preset antennas to pilot signals, and sends the pilot signals and the antenna configuration information to the terminal, and the terminal acquires channel state information of second preset antennas according to the pilot signals and the antenna configuration information, and feeds back the channel state information of the second preset antennas to the base station. In this case, mapping, by the base station, all antennas in the antenna array to pilot signals is avoided, which reduces pilot overheads.

Figure 21:
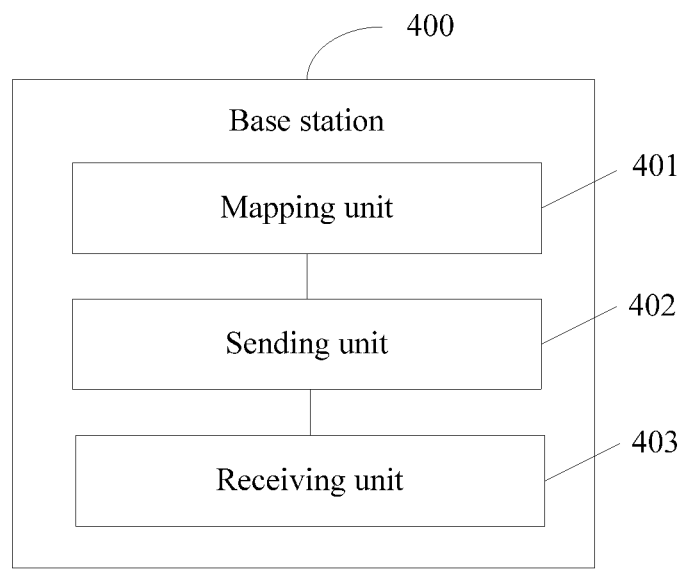
FIG. 21 is a schematic structural diagram of a base station according to an embodiment of the present disclosure.

Referring to FIG. 21, an embodiment of the present disclosure provides a base station 400, and the base station 400 is used to implement acquisition of channel state information, and includes a mapping unit 401, a sending unit 402, and a receiving unit 403.

The mapping unit 401 is configured to map first preset antennas in an antenna array to pilot signals.

The first preset antennas may be preset by the base station, or a terminal may feed back setting information of the first preset antennas to the base station, or the base station sends setting information of the first preset antennas to a terminal.

When the antenna array is a dual-polarized antenna array, the first preset antennas include embodiments where at least two antennas are not in a same row, at least two antennas are not in a same column, and at least two antennas are in different polarization directions. That at least two antennas are not in a same row may reflect a difference in signal transmission with antennas in different rows. Likewise, that at least two antennas are not in a same column may reflect a difference in signal transmission with antennas in different columns, and that at least two antennas are in different polarization directions may reflect a difference in signal transmission with antennas in different polarization directions. An interpolation operation is performed according to the differences in signal transmission in the foregoing three directions and with reference to antenna configuration information, so that channel state information of second preset antennas can be obtained.

Further, the first preset antennas further include embodiments where the antennas are in pairs, antennas in each pair are in a same row and a same column, and all the antenna pairs are in different rows and different columns.

Further optionally, the first preset antennas further include embodiments where there is an antenna in only one polarization direction in a same row and a same column, a difference between quantities of antennas in two polarization directions cannot exceed 1, and all the antennas are in different rows and different columns.

Further optionally, the first preset antennas further include embodiments where the antennas are in pairs, antennas in each pair are in a same row and a same column, there is an interval of a same quantity of rows between antenna pairs in a same column, there is an interval of a same quantity of columns between every two adjacent columns that include antennas, and antenna pairs in every two adjacent columns that include antennas are not in a same row; or the antennas are in pairs, antennas in each pair are in a same row and a same column, there is an interval of a same quantity of columns between antenna pairs in a same row, there is an interval of a same quantity of rows between every two adjacent rows that include antennas, and antenna pairs in every two adjacent rows that include antennas are not in a same column.

Further optionally, the first preset antennas further include embodiments where there is an antenna in only one polarization direction in a same row and a same column, there is an interval of a same quantity of rows between antennas in a same column, the antennas in the same column are sequentially in alternate polarization directions or are in a same polarization direction, there is an interval of a same quantity of columns between every two adjacent columns that include antennas, and antennas in every two adjacent columns that include the antennas are not in a same row; or there is an antenna in only one polarization direction in a same row and a same column, there is an interval of a same quantity of columns between antennas in a same row, the antennas in the same row are sequentially in alternate polarization directions or are in a same polarization direction, there is an interval of a same quantity of rows between every two adjacent rows that include antennas, and antennas in every two adjacent rows that include the antennas are not in a same column.

Further optionally, the first preset antennas further include embodiments where antennas at each of four corners of the antenna array that includes the first preset antennas are in pairs.

Further optionally, the first preset antennas further include embodiments where there is one antenna at each of four corners of the antenna array that includes the first preset antennas, and quantities of antennas in two polarization directions are the same.

Further optionally, the first preset antennas further include embodiments where only one pair of antennas exists, antennas in the pair are in a same row and a same column, there is an interval of a same quantity of columns between antennas in one polarization direction in the row, and there is an interval of a same quantity of rows between antennas in the other polarization direction in the column.

Further optionally, the first preset antennas further include embodiments where only one pair of antennas exists, antennas in the pair are in a same row and a same column, there is an interval of a same quantity of columns between antennas in one polarization direction in the row, and a column in which any one of the antennas in the polarization direction is located includes antennas in the other polarization direction at an equal interval of a same quantity of rows; or only one pair of antennas exists, antennas in the pair are in a same row and a same column, there is an interval of a same quantity of rows between antennas in one polarization direction in the column, and a row in which any one of the antennas in the polarization direction is located includes antennas in the other polarization direction at an equal interval of a same quantity of columns.

Further optionally, the first preset antennas further include embodiments where there is an interval of a same quantity of columns between antennas in one polarization direction in a same row, and a column in which any one of the antennas in the polarization direction is located includes antennas in the other polarization direction at an equal interval of a same quantity of rows; or there is an interval of a same quantity of rows between antennas in one polarization direction in a same column, and a row in which any one of the antennas in the polarization direction is located includes antennas in the other polarization direction at an equal interval of a same quantity of columns.

Certainly, alternatively, a quantity and an arrangement manner that are of preset antennas in the foregoing dual-polarized antenna array may vary. Selected first preset antennas belong to the scope of the present disclosure provided that the selected first preset antennas are different in three directions: rows, columns, and polarization directions.

Optionally, when the antenna is a co-polarized antenna array, the first preset antennas include embodiments where at least two antennas are not in a same row, and at least two antennas are not in a same column. That at least two antennas are not in a same row may reflect a difference in signal transmission with antennas in different rows. Likewise, that at least two antennas are not in a same column may reflect a difference in signal transmission with antennas in different columns. An interpolation operation is performed according to the differences in signal transmission in the foregoing two directions and with reference to antenna configuration information, so that channel state information of second preset antennas can be obtained.

Further, the first preset antennas further include embodiments where all the antennas are in different rows and different columns.

Further optionally, the first preset antennas further include embodiments where there is an interval of a same quantity of rows between antennas in a same column, there is an interval of a same quantity of columns between every two adjacent columns that include antennas, and antennas in every two adjacent columns that include the antennas are not in a same row; or there is an interval of a same quantity of columns between antennas in a same row, there is an interval of a same quantity of rows between every two adjacent rows that include antennas, and antennas in every two adjacent rows that include the antennas are not in a same column.

Further optionally, the first preset antennas further include embodiments where there is one antenna at each of four corners of the antenna array that includes the first preset antennas.

Further optionally, the first preset antennas further include embodiments where the first preset antennas further include embodiments where there is an interval of a same quantity of columns between antennas in one row, and a column in which any one of the antennas in the row is located includes antennas at an equal row interval.

Certainly, alternatively, a quantity and an arrangement manner that are of antennas in the foregoing co-polarized antenna array may vary. Selected first preset antennas belong to the scope of the present disclosure provided that the selected first preset antennas are different in two directions: rows and columns.

The sending unit 402 is configured to send, to the terminal, the pilot signals mapped by the mapping unit 401 and the antenna configuration information, where the antenna configuration information includes pattern information of the first preset antennas and pattern information of the second preset antennas.

The first preset antennas and the second preset antennas are in the same antenna array, and the first preset antennas are different from the second preset antennas.

When the second preset antennas include the first preset antennas, the antenna configuration information sent by the sending unit 402 includes pattern information of the first preset antennas in the second preset antennas.

Optionally, when the second preset antennas do not include the first preset antennas, the antenna configuration information sent by the sending unit 402 includes pattern information of the first preset antennas in the antenna array; and pattern information of the second preset antennas in the antenna array.

Further, the antenna configuration information sent by the sending unit 402 further includes at least one of an interval between antennas and correlation coefficients between the antennas.

The configuration information carries the interval between the antennas or the correlation coefficients between the antennas, so that the terminal can obtain the channel state information of the second preset antennas more exactly.

The receiving unit 403 is configured to receive the channel state information of the second preset antennas that is fed back by the terminal.

The base station can configure corresponding transmit antennas for the terminal according to the received channel state information of the second preset antennas.

In the foregoing embodiment, the base station selects first preset antennas from an antenna array, maps the first preset antennas to pilot signals, and sends the pilot signals and the antenna configuration information to the terminal, and the terminal acquires channel state information of second preset antennas according to the pilot signals and the antenna configuration information, and feeds back the channel state information of the second preset antennas to the base station. In this case, mapping, by the base station, all antennas in the antenna array to pilot signals is avoided, which reduces pilot overheads.

Figure 22:
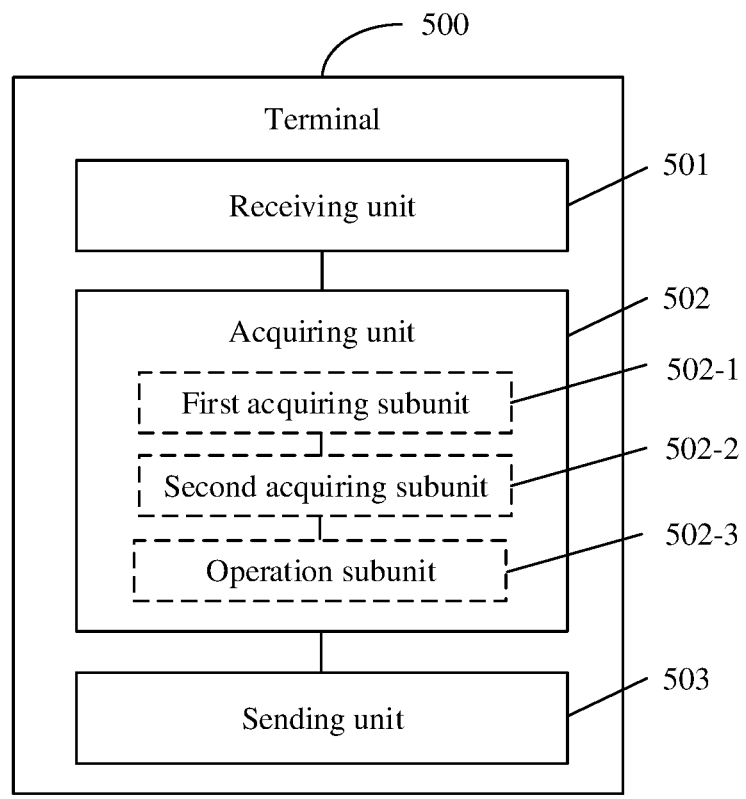
FIG. 22 is a schematic structural diagram of a terminal according to an embodiment of the present disclosure.

Referring to FIG. 22, an embodiment of the present disclosure provides a terminal 500, and the terminal 500 is used to implement acquisition of channel state information, and includes a receiving unit 501 and an acquiring unit 502.

The receiving unit 501 is configured to receive pilot signals and antenna configuration information that are sent by a base station, where the pilot signals are pilot signals to which first preset antennas in an antenna array are mapped, and the antenna configuration information includes pattern information of the first preset antennas and pattern information of second preset antennas.

The first preset antennas may be preset by the base station, or the terminal may feed back setting information of the first preset antennas to the base station, or the base station sends setting information of the first preset antennas to the terminal.

When the antenna array is a dual-polarized antenna array, the first preset antennas include embodiments where at least two antennas are not in a same row, at least two antennas are not in a same column, and at least two antennas are in different polarization directions. That at least two antennas are not in a same row may reflect a difference in signal transmission with antennas in different rows. Likewise, that at least two antennas are not in a same column may reflect a difference in signal transmission with antennas in different columns, and that at least two antennas are in different polarization directions may reflect a difference in signal transmission with antennas in different polarization directions. An interpolation operation is performed according to the differences in signal transmission in the foregoing three directions and with reference to the antenna configuration information, so that channel state information of the second preset antennas can be obtained.

Further, the first preset antennas further include embodiments where the antennas are in pairs, antennas in each pair are in a same row and a same column, and all the antenna pairs are in different rows and different columns.

Further optionally, the first preset antennas further include embodiments where there is an antenna in only one polarization direction in a same row and a same column, a difference between quantities of antennas in two polarization directions cannot exceed 1, and all the antennas are in different rows and different columns.

Further optionally, the first preset antennas further include embodiments where the antennas are in pairs, antennas in each pair are in a same row and a same column, there is an interval of a same quantity of rows between antenna pairs in a same column, there is an interval of a same quantity of columns between every two adjacent columns that include antennas, and antenna pairs in every two adjacent columns that include antennas are not in a same row; or the antennas are in pairs, antennas in each pair are in a same row and a same column, there is an interval of a same quantity of columns between antenna pairs in a same row, there is an interval of a same quantity of rows between every two adjacent rows that include antennas, and antenna pairs in every two adjacent rows that include antennas are not in a same column.

Further optionally, the first preset antennas further include embodiments where there is an antenna in only one polarization direction in a same row and a same column, there is an interval of a same quantity of rows between antennas in a same column, the antennas in the same column are sequentially in alternate polarization directions or are in a same polarization direction, there is an interval of a same quantity of columns between every two adjacent columns that include antennas, and antennas in every two adjacent columns that include the antennas are not in a same row; or there is an antenna in only one polarization direction in a same row and a same column, there is an interval of a same quantity of columns between antennas in a same row, the antennas in the same row are sequentially in alternate polarization directions or are in a same polarization direction, there is an interval of a same quantity of rows between every two adjacent rows that include antennas, and antennas in every two adjacent rows that include the antennas are not in a same column.

Further optionally, the first preset antennas further include embodiments where antennas at each of four corners of the antenna array that includes the first preset antennas are in pairs.

Further optionally, the first preset antennas further include embodiments where there is one antenna at each of four corners of the antenna array that includes the first preset antennas, and quantities of antennas in two polarization directions are the same.

Further optionally, the first preset antennas further include embodiments where only one pair of antennas exists, antennas in the pair are in a same row and a same column, there is an interval of a same quantity of columns between antennas in one polarization direction in the row, and there is an interval of a same quantity of rows between antennas in the other polarization direction in the column.

Further optionally, the first preset antennas further include embodiments where only one pair of antennas exists, antennas in the pair are in a same row and a same column, there is an interval of a same quantity of columns between antennas in one polarization direction in the row, and a column in which any one of the antennas in the polarization direction is located includes antennas in the other polarization direction at an equal interval of a same quantity of rows; or only one pair of antennas exists, antennas in the pair are in a same row and a same column, there is an interval of a same quantity of rows between antennas in one polarization direction in the column, and a row in which any one of the antennas in the polarization direction is located includes antennas in the other polarization direction at an equal interval of a same quantity of columns.

Further optionally, the first preset antennas further include embodiments where there is an interval of a same quantity of columns between antennas in one polarization direction in a same row, and a column in which any one of the antennas in the polarization direction is located includes antennas in the other polarization direction at an equal interval of a same quantity of rows; or there is an interval of a same quantity of rows between antennas in one polarization direction in a same column, and a row in which any one of the antennas in the polarization direction is located includes antennas in the other polarization direction at an equal interval of a same quantity of columns.

Certainly, alternatively, a quantity and an arrangement manner that are of preset antennas in the foregoing dual-polarized antenna array may vary. Selected first preset antennas belong to the scope of the present disclosure provided that the selected first preset antennas are different in three directions: rows, columns, and polarization directions.

Optionally, when the antenna is a co-polarized antenna array, the first preset antennas include embodiments where at least two antennas are not in a same row, and at least two antennas are not in a same column. That at least two antennas are not in a same row may reflect a difference in signal transmission with antennas in different rows. Likewise, that at least two antennas are not in a same column may reflect a difference in signal transmission with antennas in different columns. An interpolation operation is performed according to the differences in signal transmission in the foregoing two directions and with reference to the antenna configuration information, so that channel state information of the second preset antennas can be obtained.

Further, the first preset antennas further include embodiments where all the antennas are in different rows and different columns.

Further optionally, the first preset antennas further include embodiments where there is an interval of a same quantity of rows between antennas in a same column, there is an interval of a same quantity of columns between every two adjacent columns that include antennas, and antennas in every two adjacent columns that include the antennas are not in a same row; or there is an interval of a same quantity of columns between antennas in a same row, there is an interval of a same quantity of rows between every two adjacent rows that include antennas, and antennas in every two adjacent rows that include the antennas are not in a same column.

Further optionally, the first preset antennas further include embodiments where there is one antenna at each of four corners of the antenna array that includes the first preset antennas.

Further optionally, the first preset antennas further include embodiments where the first preset antennas further include embodiments where there is an interval of a same quantity of columns between antennas in one row, and a column in which any one of the antennas in the row is located includes antennas at an equal row interval.

Certainly, alternatively, a quantity and an arrangement manner that are of antennas in the foregoing co-polarized antenna array may vary. Selected first preset antennas belong to the scope of the present disclosure provided that the selected first preset antennas are different in two directions: rows and columns.

The first preset antennas and the second preset antennas are in the same antenna array, and the first preset antennas are different from the second preset antennas.

The terminal may obtain a position relationship between the first preset antennas and the second preset antennas according to the configuration information, and can perform an interpolation operation according to the position relationship, to obtain the channel state information of the second preset antennas.

When the second preset antennas include the first preset antennas, the antenna configuration information received by the receiving unit 501 includes pattern information of the first preset antennas in the second preset antennas.

Optionally, when the second preset antennas do not include the first preset antennas, the antenna configuration information received by the receiving unit 501 includes pattern information of the first preset antennas in the antenna array; and pattern information of the second preset antennas in the antenna array.

Further, the antenna configuration information received by the receiving unit 501 further includes at least one of an interval between antennas and correlation coefficients between the antennas.

The configuration information carries the interval between the antennas or the correlation coefficients between the antennas, so that the terminal can obtain the channel state information of the second preset antennas more exactly.

The acquiring unit 502 obtains the channel state information of the second preset antennas by means of calculation according to the pilot signals and the antenna configuration information that are received by the receiving unit 501.

Optionally, the acquiring unit 502 includes a first acquiring subunit 502-1 configured to acquire a channel matrix corresponding to the first preset antennas from the pilot signals; a second acquiring subunit 502-2 configured to acquire the position relationship between the first preset antennas and the second preset antennas from the antenna configuration information; and an operation subunit 502-3 configured to perform an interpolation operation according to the channel matrix that is corresponding to the first preset antennas and is acquired by the first acquiring subunit and the position relationship that is between the first preset antennas and the second preset antennas and is acquired by the second acquiring subunit, to obtain the channel state information of the second preset antennas.

Channel state information of an antenna includes rank information, a precoding matrix indicator, and a channel quality indicator that are of the antenna.

Further, the terminal 500 further includes a sending unit 503, sends, to the base station, the channel state information of the second preset antennas that is acquired by the acquiring unit 502.

The sending unit 503 is configured to send, to the base station, rank information, a precoding matrix indicator, and a channel quality indicator that are of the second preset antennas.

Optionally, the sending unit 503 is configured to send, to the base station, rank information, a precoding matrix indicator, and a channel quality indicator that are of the second preset antennas, and send, to the base station, rank information, a precoding matrix indicator, and a channel quality indicator that are of the first preset antennas. In this case, the channel state information of the first preset antennas can be acquired exactly.

Optionally, the sending unit 503 is configured to send, to the base station, rank information of the second preset antennas, a structure of a differential codebook of precoding matrix indicators of the first preset antennas and the second preset antennas, and a channel quality indicator of the second preset antennas, and send, to the base station, rank information, the precoding matrix indicator, and a channel quality indicator that are of the first preset antennas; or the sending unit 503 is configured to send, to the base station, rank information of the second preset antennas, a precoding matrix indicator of the second preset antennas, and a differential channel quality indicator of the first preset antennas and the second preset antennas, and send, to the base station, rank information, a precoding matrix indicator, and a channel quality indicator that are of the first preset antennas; or the sending unit 503 is configured to send, to the base station, rank information of the second preset antennas, a structure of a differential codebook of precoding matrix indicators of the first preset antennas and the second preset antennas, and a differential channel quality indicator of the first preset antennas and the second preset antennas, and send, to the base station, rank information, the precoding matrix indicator, and a channel quality indicator that are of the first preset antennas.

The base station can obtain the precoding matrix indicator of the second preset antennas using the foregoing structure of the differential codebook of the precoding matrix indicators of the first preset antennas and the second preset antennas. Likewise, the base station can obtain the channel quality indicator of the second preset antennas using the foregoing differential channel quality indicator of the first preset antennas and the second preset antennas. The structure of the differential codebook of the precoding matrix indicators of the first preset antennas and the second preset antennas and the differential channel quality indicator of the first preset antennas and the second preset antennas occupy relatively fewer resources; therefore, in this case, pilot overheads can be reduced.

In the foregoing embodiment, the terminal receives pilot signals to which first preset antennas are mapped, where the first preset antennas are selected by a base station from an antenna array; also receives the antenna configuration information; acquires channel state information of second preset antennas according to the pilot signals and the antenna configuration information; and feeds back the channel state information of the second preset antennas to the base station. In this case, mapping, by the base station, all antennas in the antenna array to pilot signals is avoided, which reduces pilot overheads.

Figure 23:
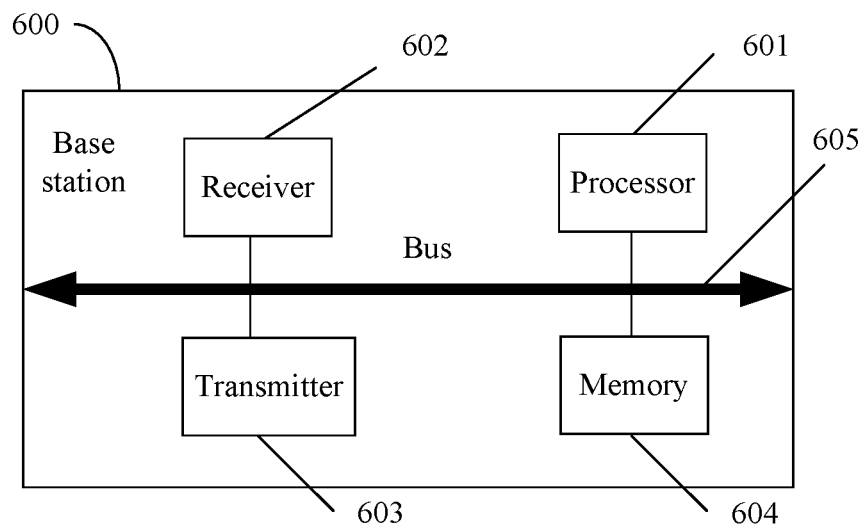
FIG. 23 is a schematic structural diagram of a base station according to another embodiment of the present disclosure.

Referring to FIG. 23, an embodiment of the present disclosure provides a base station 600, including a processor 601, a receiver 602, a transmitter 603, a memory 604, and a bus 605, where the processor 601, the receiver 602, and the transmitter 603 are connected using the bus 605, and the memory 604 is configured to store data to be processed by the processor 601.

The bus 605 may be an Industry Standard Architecture (ISA) bus, a Peripheral Component Interconnect (PCI) bus, an Extended Industry Standard Architecture (EISA) bus, or the like. The bus 605 may be an address bus, a data bus, a control bus, or the like by category. For ease of denotation, the bus 605 is represented using only one thick line in FIG. 23, which, however, does not indicate that there is only one bus or only one type of bus.

The memory 604 is configured to store executable program code, where the program code includes a computer operation instruction. The memory 604 may include a high-speed random access memory (RAM), and may further include a non-volatile memory, such as at least one magnetic disk memory.

The processor 601 may be a central processing unit (CPU) or an application-specific integrated circuit (ASIC), or is configured as one or more integrated circuits that implement this embodiment of the present disclosure.

The processor is configured to map first preset antennas in an antenna array to pilot signals.

The first preset antennas may be preset by the base station, or a terminal may feed back setting information of the first preset antennas to the base station, or the base station sends setting information of the first preset antennas to a terminal.

When the antenna array is a dual-polarized antenna array, the first preset antennas include embodiments where at least two antennas are not in a same row, at least two antennas are not in a same column, and at least two antennas are in different polarization directions. That at least two antennas are not in a same row may reflect a difference in signal transmission with antennas in different rows. Likewise, that at least two antennas are not in a same column may reflect a difference in signal transmission with antennas in different columns, and that at least two antennas are in different polarization directions may reflect a difference in signal transmission with antennas in different polarization directions. An interpolation operation is performed according to the differences in signal transmission in the foregoing three directions and with reference to antenna configuration information, so that channel state information of second preset antennas can be obtained.

Further, the first preset antennas further include embodiments where the antennas are in pairs, antennas in each pair are in a same row and a same column, and all the antenna pairs are in different rows and different columns.

Further optionally, the first preset antennas further include embodiments where there is an antenna in only one polarization direction in a same row and a same column, a difference between quantities of antennas in two polarization directions cannot exceed 1, and all the antennas are in different rows and different columns.

Further optionally, the first preset antennas further include embodiments where the antennas are in pairs, antennas in each pair are in a same row and a same column, there is an interval of a same quantity of rows between antenna pairs in a same column, there is an interval of a same quantity of columns between every two adjacent columns that include antennas, and antenna pairs in every two adjacent columns that include antennas are not in a same row; or the antennas are in pairs, antennas in each pair are in a same row and a same column, there is an interval of a same quantity of columns between antenna pairs in a same row, there is an interval of a same quantity of rows between every two adjacent rows that include antennas, and antenna pairs in every two adjacent rows that include antennas are not in a same column.

Further optionally, the first preset antennas further include embodiments where there is an antenna in only one polarization direction in a same row and a same column, there is an interval of a same quantity of rows between antennas in a same column, the antennas in the same column are sequentially in alternate polarization directions or are in a same polarization direction, there is an interval of a same quantity of columns between every two adjacent columns that include antennas, and antennas in every two adjacent columns that include the antennas are not in a same row; or there is an antenna in only one polarization direction in a same row and a same column, there is an interval of a same quantity of columns between antennas in a same row, the antennas in the same row are sequentially in alternate polarization directions or are in a same polarization direction, there is an interval of a same quantity of rows between every two adjacent rows that include antennas, and antennas in every two adjacent rows that include the antennas are not in a same column.

Further optionally, the first preset antennas further include embodiments where antennas at each of four corners of the antenna array that includes the first preset antennas are in pairs.

Further optionally, the first preset antennas further include embodiments where there is one antenna at each of four corners of the antenna array that includes the first preset antennas, and quantities of antennas in two polarization directions are the same.

Further optionally, the first preset antennas further include embodiments where only one pair of antennas exists, antennas in the pair are in a same row and a same column, there is an interval of a same quantity of columns between antennas in one polarization direction in the row, and there is an interval of a same quantity of rows between antennas in the other polarization direction in the column.

Further optionally, the first preset antennas further include embodiments where only one pair of antennas exists, antennas in the pair are in a same row and a same column, there is an interval of a same quantity of columns between antennas in one polarization direction in the row, and a column in which any one of the antennas in the polarization direction is located includes antennas in the other polarization direction at an equal interval of a same quantity of rows; or only one pair of antennas exists, antennas in the pair are in a same row and a same column, there is an interval of a same quantity of rows between antennas in one polarization direction in the column, and a row in which any one of the antennas in the polarization direction is located includes antennas in the other polarization direction at an equal interval of a same quantity of columns.

Further optionally, the first preset antennas further include embodiments where there is an interval of a same quantity of columns between antennas in one polarization direction in a same row, and a column in which any one of the antennas in the polarization direction is located includes antennas in the other polarization direction at an equal interval of a same quantity of rows; or there is an interval of a same quantity of rows between antennas in one polarization direction in a same column, and a row in which any one of the antennas in the polarization direction is located includes antennas in the other polarization direction at an equal interval of a same quantity of columns.

Certainly, alternatively, a quantity and an arrangement manner that are of preset antennas in the foregoing dual-polarized antenna array may vary. Selected first preset antennas belong to the scope of the present disclosure provided that the selected first preset antennas are different in three directions: rows, columns, and polarization directions.

Optionally, when the antenna is a co-polarized antenna array, the first preset antennas include embodiments where at least two antennas are not in a same row, and at least two antennas are not in a same column. That at least two antennas are not in a same row may reflect a difference in signal transmission with antennas in different rows. Likewise, that at least two antennas are not in a same column may reflect a difference in signal transmission with antennas in different columns. An interpolation operation is performed according to the differences in signal transmission in the foregoing two directions and with reference to antenna configuration information, so that channel state information of second preset antennas can be obtained.

Further, the first preset antennas further include embodiments where all the antennas are in different rows and different columns.

Further optionally, the first preset antennas further include embodiments where there is an interval of a same quantity of rows between antennas in a same column, there is an interval of a same quantity of columns between every two adjacent columns that include antennas, and antennas in every two adjacent columns that include the antennas are not in a same row; or there is an interval of a same quantity of columns between antennas in a same row, there is an interval of a same quantity of rows between every two adjacent rows that include antennas, and antennas in every two adjacent rows that include the antennas are not in a same column.

Further optionally, the first preset antennas further include embodiments where there is one antenna at each of four corners of the antenna array that includes the first preset antennas.

Further optionally, the first preset antennas further include embodiments where the first preset antennas further include embodiments where there is an interval of a same quantity of columns between antennas in one row, and a column in which any one of the antennas in the row is located includes antennas at an equal row interval.

Certainly, alternatively, a quantity and an arrangement manner that are of antennas in the foregoing co-polarized antenna array may vary. Selected first preset antennas belong to the scope of the present disclosure provided that the selected first preset antennas are different in two directions: rows and columns.

The transmitter 603 is configured to send the pilot signals and the antenna configuration information to the terminal, where the antenna configuration information includes pattern information of the first preset antennas and pattern information of the second preset antennas.

The first preset antennas and the second preset antennas are in the same antenna array, and the first preset antennas are different from the second preset antennas.

When the second preset antennas include the first preset antennas, the antenna configuration information sent by the transmitter 603 includes pattern information of the first preset antennas in the second preset antennas.

Optionally, when the second preset antennas do not include the first preset antennas, the antenna configuration information sent by the transmitter 603 includes pattern information of the first preset antennas in the antenna array; and pattern information of the second preset antennas in the antenna array.

Further, the antenna configuration information sent by the transmitter 603 further includes at least one of an interval between antennas and correlation coefficients between the antennas.

The configuration information carries the interval between the antennas or the correlation coefficients between the antennas, so that the terminal can obtain the channel state information of the second preset antennas more exactly.

The receiver 602 is configured to receive the channel state information of the second preset antennas that is fed back by the terminal.

The base station can configure corresponding transmit antennas for the terminal according to the received channel state information of the second preset antennas.

In the foregoing embodiment, the base station selects first preset antennas from an antenna array, maps the first preset antennas to pilot signals, and sends the pilot signals and the antenna configuration information to the terminal, and the terminal acquires channel state information of second preset antennas according to the pilot signals and the antenna configuration information, and feeds back the channel state information of the second preset antennas to the base station. In this case, mapping, by the base station, all antennas in the antenna array to pilot signals is avoided, which reduces pilot overheads.

Figure 24:
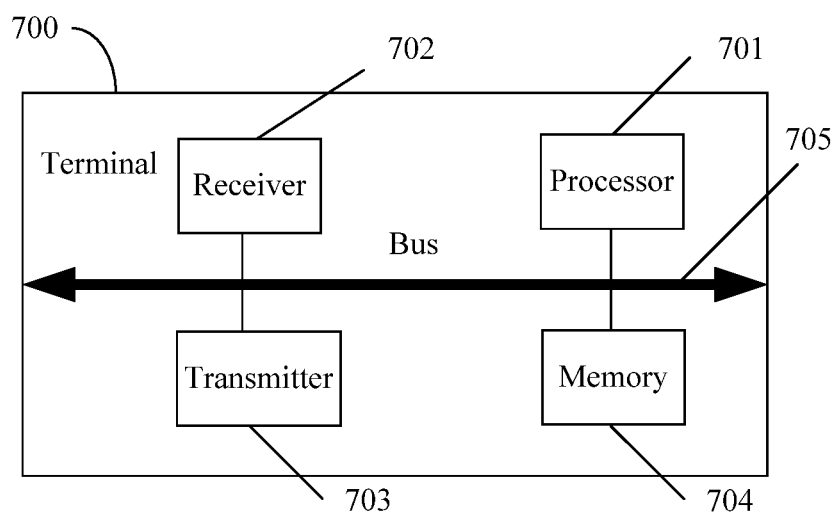
FIG. 24 is a schematic structural diagram of a terminal according to another embodiment of the present disclosure.

Referring to FIG. 24, an embodiment of the present disclosure provides a terminal 700, including a processor 701, a receiver 702, a transmitter 703, a memory 704, and a bus 705, where the processor 701, the receiver 702, and the transmitter 703 are connected using the bus 705, and the memory 704 is configured to store data to be processed by the processor 701.

The bus 705 may be an ISA bus, a PCI bus, an EISA bus, or the like. The bus 705 may be an address bus, a data bus, a control bus, or the like by category. For ease of denotation, the bus 705 is represented using only one thick line in FIG. 24, which, however, does not indicate that there is only one bus or only one type of bus.

The memory 704 is configured to store executable program code, where the program code includes a computer operation instruction. The memory 704 may include a high-speed RAM memory, and may further include a non-volatile memory, such as at least one magnetic disk memory.

The processor 701 may be a CPU or an ASIC, or is configured as one or more integrated circuits that implement this embodiment of the present disclosure.

The receiver 702 is configured to receive pilot signals and antenna configuration information that are sent by a base station, where the pilot signals are pilot signals to which first preset antennas in an antenna array are mapped, and the antenna configuration information includes pattern information of the first preset antennas and pattern information of second preset antennas.

The first preset antennas may be preset by the base station, or the terminal may feed back setting information of the first preset antennas to the base station, or the base station sends setting information of the first preset antennas to the terminal.

When the antenna array is a dual-polarized antenna array, the first preset antennas include embodiments where at least two antennas are not in a same row, at least two antennas are not in a same column, and at least two antennas are in different polarization directions. That at least two antennas are not in a same row may reflect a difference in signal transmission with antennas in different rows. Likewise, that at least two antennas are not in a same column may reflect a difference in signal transmission with antennas in different columns, and that at least two antennas are in different polarization directions may reflect a difference in signal transmission with antennas in different polarization directions. An interpolation operation is performed according to the differences in signal transmission in the foregoing three directions and with reference to the antenna configuration information, so that channel state information of the second preset antennas can be obtained.

Further, the first preset antennas further include embodiments where the antennas are in pairs, antennas in each pair are in a same row and a same column, and all the antenna pairs are in different rows and different columns.

Further optionally, the first preset antennas further include embodiments where there is an antenna in only one polarization direction in a same row and a same column, a difference between quantities of antennas in two polarization directions cannot exceed 1, and all the antennas are in different rows and different columns.

Further optionally, the first preset antennas further include embodiments where the antennas are in pairs, antennas in each pair are in a same row and a same column, there is an interval of a same quantity of rows between antenna pairs in a same column, there is an interval of a same quantity of columns between every two adjacent columns that include antennas, and antenna pairs in every two adjacent columns that include antennas are not in a same row; or the antennas are in pairs, antennas in each pair are in a same row and a same column, there is an interval of a same quantity of columns between antenna pairs in a same row, there is an interval of a same quantity of rows between every two adjacent rows that include antennas, and antenna pairs in every two adjacent rows that include antennas are not in a same column.

Further optionally, the first preset antennas further include embodiments where there is an antenna in only one polarization direction in a same row and a same column, there is an interval of a same quantity of rows between antennas in a same column, the antennas in the same column are sequentially in alternate polarization directions or are in a same polarization direction, there is an interval of a same quantity of columns between every two adjacent columns that include antennas, and antennas in every two adjacent columns that include the antennas are not in a same row; or there is an antenna in only one polarization direction in a same row and a same column, there is an interval of a same quantity of columns between antennas in a same row, the antennas in the same row are sequentially in alternate polarization directions or are in a same polarization direction, there is an interval of a same quantity of rows between every two adjacent rows that include antennas, and antennas in every two adjacent rows that include the antennas are not in a same column.

Further optionally, the first preset antennas further include embodiments where antennas at each of four corners of the antenna array that includes the first preset antennas are in pairs.

Further optionally, the first preset antennas further include embodiments where there is one antenna at each of four corners of the antenna array that includes the first preset antennas, and quantities of antennas in two polarization directions are the same.

Further optionally, the first preset antennas further include embodiments where only one pair of antennas exists, antennas in the pair are in a same row and a same column, there is an interval of a same quantity of columns between antennas in one polarization direction in the row, and there is an interval of a same quantity of rows between antennas in the other polarization direction in the column.

Further optionally, the first preset antennas further include embodiments where only one pair of antennas exists, antennas in the pair are in a same row and a same column, there is an interval of a same quantity of columns between antennas in one polarization direction in the row, and a column in which any one of the antennas in the polarization direction is located includes antennas in the other polarization direction at an equal interval of a same quantity of rows; or only one pair of antennas exists, antennas in the pair are in a same row and a same column, there is an interval of a same quantity of rows between antennas in one polarization direction in the column, and a row in which any one of the antennas in the polarization direction is located includes antennas in the other polarization direction at an equal interval of a same quantity of columns.

Further optionally, the first preset antennas further include embodiments where there is an interval of a same quantity of columns between antennas in one polarization direction in a same row, and a column in which any one of the antennas in the polarization direction is located includes antennas in the other polarization direction at an equal interval of a same quantity of rows; or there is an interval of a same quantity of rows between antennas in one polarization direction in a same column, and a row in which any one of the antennas in the polarization direction is located includes antennas in the other polarization direction at an equal interval of a same quantity of columns.

Certainly, alternatively, a quantity and an arrangement manner that are of preset antennas in the foregoing dual-polarized antenna array may vary. Selected first preset antennas belong to the scope of the present disclosure provided that the selected first preset antennas are different in three directions: rows, columns, and polarization directions.

Optionally, when the antenna is a co-polarized antenna array, the first preset antennas include embodiments where at least two antennas are not in a same row, and at least two antennas are not in a same column. That at least two antennas are not in a same row may reflect a difference in signal transmission with antennas in different rows. Likewise, that at least two antennas are not in a same column may reflect a difference in signal transmission with antennas in different columns. An interpolation operation is performed according to the differences in signal transmission in the foregoing two directions and with reference to the antenna configuration information, so that channel state information of the second preset antennas can be obtained.

Further, the first preset antennas further include embodiments where all the antennas are in different rows and different columns.

Further optionally, the first preset antennas further include embodiments where there is an interval of a same quantity of rows between antennas in a same column, there is an interval of a same quantity of columns between every two adjacent columns that include antennas, and antennas in every two adjacent columns that include the antennas are not in a same row; or there is an interval of a same quantity of columns between antennas in a same row, there is an interval of a same quantity of rows between every two adjacent rows that include antennas, and antennas in every two adjacent rows that include the antennas are not in a same column.

Further optionally, the first preset antennas further include embodiments where there is one antenna at each of four corners of the antenna array that includes the first preset antennas.

Further optionally, the first preset antennas further include embodiments where the first preset antennas further include embodiments where there is an interval of a same quantity of columns between antennas in one row, and a column in which any one of the antennas in the row is located includes antennas at an equal row interval.

Certainly, alternatively, a quantity and an arrangement manner that are of antennas in the foregoing co-polarized antenna array may vary. Selected first preset antennas belong to the scope of the present disclosure provided that the selected first preset antennas are different in two directions: rows and columns.

The first preset antennas and the second preset antennas are in the same antenna array, and the first preset antennas are different from the second preset antennas.

The terminal may obtain a position relationship between the first preset antennas and the second preset antennas according to the configuration information, and can perform an interpolation operation according to the position relationship, to obtain the channel state information of the second preset antennas.

When the second preset antennas include the first preset antennas, the antenna configuration information received by the receiver 702 includes pattern information of the first preset antennas in the second preset antennas.

Optionally, when the second preset antennas do not include the first preset antennas, the antenna configuration information received by the receiver 702 includes pattern information of the first preset antennas in the antenna array; and pattern information of the second preset antennas in the antenna array.

Further, the antenna configuration information received by the receiver 702 further includes at least one of an interval between antennas and correlation coefficients between the antennas.

The configuration information carries the interval between the antennas or the correlation coefficients between the antennas, so that the terminal can obtain the channel state information of the second preset antennas more exactly.

The processor 701 is configured to obtain the channel state information of the second preset antennas by means of calculation according to the pilot signals and the antenna configuration information that are received by the receiver 702.

Optionally, the processor 701 is configured to acquire a channel matrix corresponding to the first preset antennas from the pilot signals; acquire the position relationship between the first preset antennas and the second preset antennas from the antenna configuration information; and perform an interpolation operation according to the channel matrix corresponding to the first preset antennas and the position relationship between the first preset antennas and the second preset antennas, to obtain the channel state information of the second preset antennas.

Channel state information of an antenna includes rank information, a precoding matrix indicator, and a channel quality indicator that are of the antenna.

The transmitter 703 is configured to send the channel state information of the second preset antennas to the base station.

The transmitter 703 is configured to send, to the base station, rank information, a precoding matrix indicator, and a channel quality indicator that are of the second preset antennas.

Optionally, the transmitter 703 is configured to send, to the base station, rank information, a precoding matrix indicator, and a channel quality indicator that are of the second preset antennas, and send, to the base station, rank information, a precoding matrix indicator, and a channel quality indicator that are of the first preset antennas. In this case, the channel state information of the first preset antennas can be acquired exactly.

Optionally, the transmitter 703 is configured to send, to the base station, rank information of the second preset antennas, a structure of a differential codebook of precoding matrix indicators of the first preset antennas and the second preset antennas, and a channel quality indicator of the second preset antennas, and send, to the base station, rank information, the precoding matrix indicator, and a channel quality indicator that are of the first preset antennas; or the transmitter 703 is configured to send, to the base station, rank information of the second preset antennas, a precoding matrix indicator of the second preset antennas, and a differential channel quality indicator of the first preset antennas and the second preset antennas, and send, to the base station, rank information, a precoding matrix indicator, and a channel quality indicator that are of the first preset antennas; or the transmitter 703 is configured to send, to the base station, rank information of the second preset antennas, a structure of a differential codebook of precoding matrix indicators of the first preset antennas and the second preset antennas, and a differential channel quality indicator of the first preset antennas and the second preset antennas, and send, to the base station, rank information, the precoding matrix indicator, and a channel quality indicator that are of the first preset antennas.

The base station can obtain the precoding matrix indicator of the second preset antennas using the foregoing structure of the differential codebook of the precoding matrix indicators of the first preset antennas and the second preset antennas. Likewise, the base station can obtain the channel quality indicator of the second preset antennas using the foregoing differential channel quality indicator of the first preset antennas and the second preset antennas. The structure of the differential codebook of the precoding matrix indicators of the first preset antennas and the second preset antennas and the differential channel quality indicator of the first preset antennas and the second preset antennas occupy relatively fewer resources; therefore, in this case, pilot overheads can be reduced.

In the foregoing embodiment, the terminal receives pilot signals to which first preset antennas are mapped, where the first preset antennas are selected by a base station from an antenna array; also receives the antenna configuration information; acquires channel state information of second preset antennas according to the pilot signals and the antenna configuration information; and feeds back the channel state information of the second preset antennas to the base station. In this case, mapping, by the base station, all antennas in the antenna array to pilot signals is avoided, which reduces pilot overheads.

Figure 25:
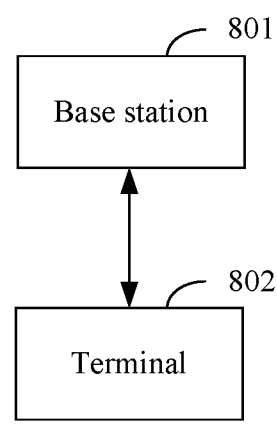
FIG. 25 is a schematic diagram of a system for acquiring channel information according to an embodiment of the present disclosure.

Referring to FIG. 25, an embodiment of the present disclosure provides a communications system, and the communications system is used to implement acquisition of channel information, and includes a base station 801 and a terminal 802 that can communicate with each other. The base station 801 is either of base stations described in the embodiment corresponding to FIG. 21 or FIG. 23, and the terminal 802 is either of terminals described in the embodiment corresponding to FIG. 22 or FIG. 24; therefore, structures of the base station 801 and the terminal 802 are not described herein again.

In the foregoing system embodiment, a base station selects some antennas from an antenna array, and maps the some antennas to pilot signals, a terminal receives the antenna configuration information and pattern information of the antenna array, and the terminal acquires channel state information of the antenna array from received information. In this case, mapping, by the base station, all antennas in the antenna array to pilot signals is avoided, which reduces pilot overheads.

In the foregoing embodiment, a base station selects first preset antennas from an antenna array, maps the first preset antennas to pilot signals, and sends the pilot signals and the antenna configuration information to the terminal, and the terminal acquires channel state information of second preset antennas according to the pilot signals and the antenna configuration information, and feeds back the channel state information of the second preset antennas to the base station. In this case, mapping, by the base station, all antennas in the antenna array to pilot signals is avoided, which reduces pilot overheads.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for acquiring channel information, comprising:
   mapping, by a base station, first preset antennas in an antenna array to pilot signals;
   sending, by the base station, the pilot signals and antenna configuration information to a terminal, wherein the antenna configuration information comprises pattern information of the first preset antennas and pattern information of second preset antennas; and
   receiving, by the base station, channel state information of the second preset antennas that is fed back by the terminal, wherein the terminal performs an interpolation operation according to a channel matrix corresponding to the first preset antennas and a position relationship between the first preset antennas and the second preset antennas based on the pilot signals and the antenna configuration information in order to obtain the channel state information of the second preset antennas, wherein the first preset antennas and the second preset antennas are in the same antenna array, and wherein the first preset antennas are different from the second preset antennas.

2. The method according to claim 1, wherein the antenna array is a dual-polarized antenna array, and wherein the first preset antennas are one of: at least two antennas are not in a same row, at least two antennas are not in a same column, or at least two antennas are in different polarization directions.

3. The method according to claim 1, wherein the second preset antennas comprise the first preset antennas, and wherein the antenna configuration information comprises pattern information of the first preset antennas in the second preset antennas.

4. The method according to claim 1, wherein the second preset antennas do not comprise the first preset antennas, and wherein the antenna configuration information comprises:
   pattern information of the first preset antennas in the antenna array; and
   pattern information of the second preset antennas in the antenna array.

5. The method according to claim 1, wherein the antenna configuration information further comprises at least one of an interval between antennas of the antenna array or correlation coefficients between the antennas.

6. A base station, comprising
   a processor;
   a receiver;
   a transmitter;

a memory configured to store data to be processed by the processor; and a bus connecting the processor, the receiver, the transmitter, and the memory, wherein the processor is configured to map first preset antennas in an antenna array to pilot signals, wherein the transmitter is configured to send the pilot signals and antenna configuration information to a terminal, wherein the antenna configuration information comprises pattern information of the first preset antennas and pattern information of second preset antennas, wherein the receiver is configured to receive channel state information of the second preset antennas from the terminal, wherein the terminal performs an interpolation operation according to a channel matrix corresponding to the first preset antennas and a position relationship between the first preset antennas and the second preset antennas based on the pilot signals and the antenna configuration information in order to obtain the channel state information of the second preset antennas, wherein the first preset antennas and the second preset antennas are in the same antenna array, and wherein the first preset antennas are different from the second preset antennas.

7. The base station according to claim 6, wherein the antenna array is a dual-polarized antenna array, and wherein the first preset antennas are one of: at least two antennas are not in a same row, at least two antennas are not in a same column, or at least two antennas are in different polarization directions.

8. The base station according to claim 6, wherein the second preset antennas comprise the first preset antennas, and wherein the antenna configuration information sent by the transmitter comprises pattern information of the first preset antennas in the second preset antennas.

9. The base station according to claim 6, wherein the second preset antennas do not comprise the first preset antennas, and wherein the antenna configuration information sent by the transmitter comprises:

pattern information of the first preset antennas in the antenna array; and pattern information of the second preset antennas in the antenna array.

10. The base station according to claim 6, wherein the antenna configuration information sent by the transmitter further comprises at least one of an interval between antennas of the antenna array or correlation coefficients between the antennas.

11. A terminal, comprising a receiver configured to receive pilot signals and antenna configuration information from a base station, wherein the pilot signals are pilot signals to which first preset antennas in an antenna array are mapped, and wherein the antenna configuration information comprises pattern information of the first preset antennas and pattern information of second preset antennas;

a memory configured to store data to be processed; and a processor coupled to the memory and the receiver and configured to:

obtain channel state information of the second preset antennas by means of calculation according to the pilot signals and the antenna configuration information;

acquire a channel matrix corresponding to the first preset antennas from the pilot signals;

acquire a position relationship between the first preset antennas and the second preset antennas from the antenna configuration information; and perform an interpolation operation according to the channel matrix corresponding to the first preset antennas and the position relationship between the first preset antennas and the second preset antennas to obtain the channel state information of the second preset antennas; and a transmitter coupled to the processor and configured to send the channel state information of the second preset antennas to the base station, wherein the first preset antennas and the second preset antennas are in the same antenna array, and wherein the first preset antennas are different from the second preset antennas.

12. The terminal according to claim 11, wherein the antenna array is a dual-polarized antenna array, and wherein the first preset antennas are one of: at least two antennas are not in a same row, at least two antennas are not in a same column, or at least two antennas are in different polarization directions.

13. The terminal according to claim 11, wherein the second preset antennas comprise the first preset antennas, and wherein the antenna configuration information received by the receiver comprises pattern information of the first preset antennas in the second preset antennas.

14. The terminal according to claim 11, wherein the second preset antennas do not comprise the first preset antennas, and wherein the antenna configuration information received by the receiver comprises:

pattern information of the first preset antennas in the antenna array; and pattern information of the second preset antennas in the antenna array.

15. The terminal according to claim 11, wherein the antenna configuration information received by the receiver further comprises at least one of an interval between antennas of the antenna array or correlation coefficients between the antennas.

16. The terminal according to claim 11, wherein the transmitter is further configured to send, to the base station, rank information, a precoding matrix indicator, and a channel quality indicator that are of the second preset antennas.

17. The terminal according to claim 11, wherein the transmitter is further configured to:

send, to the base station, rank information, a precoding matrix indicator, and a channel quality indicator that are of the second preset antennas; and send, to the base station, rank information, a precoding matrix indicator, and a channel quality indicator that are of the first preset antennas.

18. The terminal according to claim 11, wherein the transmitter being configured to send the channel state information of the second preset antennas to the base station comprises the processor being configured to do at least one of the following:

send, to the base station, rank information of the second preset antennas, a structure of a differential codebook of precoding matrix indicators of the first preset antennas and the second preset antennas, and a channel quality indicator of the second preset antennas, and send, to the base station, rank information, the precoding matrix indicators, and a channel quality indicator that are of the first preset antennas;

send, to the base station, rank information of the second preset antennas, a precoding matrix indicator of the second preset antennas, and a differential channel quality indicator of the first preset antennas and the second preset antennas, and send, to the base station, rank information, a precoding matrix indicator, and a channel quality indicator that are of the first preset antennas; or send, to the base station, rank information of the second preset antennas, a structure of a differential codebook of precoding matrix indicators of the first preset antennas and the second preset antennas, and a differential channel quality indicator of the first preset antennas and the second preset antennas, and send, to the base station, rank information, the precoding matrix indicator, and a channel quality indicator that are of the first preset antennas.

* * * * *